United States Patent
Ando et al.

(10) Patent No.: US 11,597,280 B2
(45) Date of Patent: Mar. 7, 2023

(54) DISPLAY DEVICE AND ON-BOARD INFORMATION DISPLAY METHOD

(71) Applicant: Mitsubishi Electric Corporation, Tokyo (JP)

(72) Inventors: Eisho Ando, Tokyo (JP); Masayo Nakagawa, Tokyo (JP); Akira Sugimoto, Hyogo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 824 days.

(21) Appl. No.: 16/479,712

(22) PCT Filed: Jan. 30, 2017

(86) PCT No.: PCT/JP2017/003231
§ 371 (c)(1),
(2) Date: Jul. 22, 2019

(87) PCT Pub. No.: WO2018/138923
PCT Pub. Date: Aug. 2, 2018

(65) Prior Publication Data
US 2021/0323588 A1  Oct. 21, 2021

(51) Int. Cl.
*B60L 3/00* (2019.01)
*B61L 15/00* (2006.01)

(52) U.S. Cl.
CPC ............... *B60L 3/00* (2013.01); *B61L 15/009* (2013.01); *B61L 15/0072* (2013.01)

(58) Field of Classification Search
None
See application file for complete search history.

(56) References Cited

U.S. PATENT DOCUMENTS 4,825,189 A * 4/1989 Honma ................. B61L 25/028
                                                        246/166.1
5,777,547 A * 7/1998 Waldrop ............. B61L 15/0036
                                                        340/536
(Continued)

FOREIGN PATENT DOCUMENTS

JP      H0710664 B2      2/1995
JP      08033106 A  *   2/1996
(Continued)

OTHER PUBLICATIONS

Office Action dated Jul. 30, 2020, issued in corresponding Indian Patent Application No. 201947027446, 5 pages.
(Continued)

*Primary Examiner* — Christian Chace
*Assistant Examiner* — Shayne M. Gilbertson
(74) *Attorney, Agent, or Firm* — Buchanan Ingersoll & Rooney PC

(57) ABSTRACT

A display device includes a drawing processing unit displaying a status of a device mounted on a train car, and a data collection unit including a signal definition holding unit holding signal definitions to be bases of first signals requesting information on the status of the device, a signal mapping management unit acquiring configuration information on the number of cars and a traveling direction, and generating the first signals, based on the signal definitions and configuration information to request information on the device status, a signal data storage unit holding a value of a second signal as information on the device status acquired by the signal mapping management unit's request, and a signal mapping generation unit generating signal mapping information for specifying the order of the cars on a display screen, based on the configuration information, and outputting the signal mapping information to the signal data storage unit.

16 Claims, 16 Drawing Sheets

(56) References Cited

U.S. PATENT DOCUMENTS

| | | | | |
|---|---|---|---|---|
| 9,296,401 B1* | 3/2016 | Palmer | ................. | B61L 25/025 |
| 2010/0262321 A1* | 10/2010 | Daum | ................... | B61L 15/009 |
| | | | | 701/19 |
| 2010/0302974 A1* | 12/2010 | Niiyama | .............. | G07C 5/0808 |
| | | | | 370/254 |
| 2014/0042279 A1* | 2/2014 | Kadono | ................ | B61L 25/025 |
| | | | | 246/167 R |
| 2014/0049408 A1* | 2/2014 | Morimoto | ........... | B61L 15/0072 |
| | | | | 340/988 |
| 2015/0291193 A1* | 10/2015 | Perras | ................... | B61L 25/025 |
| | | | | 246/122 R |
| 2017/0369084 A1 | 12/2017 | Goda et al. | | |

FOREIGN PATENT DOCUMENTS

| | | |
|---|---|---|
| JP | H0833106 A | 2/1996 |
| JP | 2009101964 A | 5/2009 |
| JP | 2011-010279 A | 1/2011 |
| KR | 100288748 * | 10/2000 |
| KR | 101676840 B1 | 11/2016 |
| WO | 2016117025 A1 | 7/2016 |

OTHER PUBLICATIONS

International Search Report (PCT/ISA/210) dated Apr. 25, 2017, by the Japan Patent Office as the International Searching Authority for International Application No. PCT/JP2017/003231.

Japanese Office Action (Notification of Reasons for Refusal) dated Apr. 2, 2019, issued in corresponding Japanese Patent Application No. 2018-564084, and a English Translation thereof. (6 pages).

Written Opinion (PCT/ISA/237) dated Apr. 25, 2017, by the Japan Patent Office as the International Searching Authority for International Application No. PCT/JP2017/003231.

Office Action dated Aug. 27, 2019, issued in corresponding Japanese Patent Application No. 2018-564084, 6 pages including 4 pages of English translation.

* cited by examiner

|  | M001 | M002 | M003 | M004 | M005 | M006 |
|---|---|---|---|---|---|---|
| FAILURE PRESENCE/ ABSENCE | 0 | 0 | 1 | 0 | 0 | 1 |
| VEHICLE COUNT | 6 |  |  |  |  |  |
| TRAVELING DIRECTION | 0 |  |  |  |  |  |

|  | M001 | M002 | M003 | M004 | M005 | M006 |
|---|---|---|---|---|---|---|
| DOOR L1 | 0 | 0 | 0 | 0 | 0 | 0 |
| DOOR L2 | 1 | 0 | 0 | 0 | 0 | 0 |
| DOOR R1 | 0 | 1 | 0 | 0 | 0 | 0 |
| DOOR R2 | 0 | 0 | 0 | 0 | 0 | 0 |
| VEHICLE COUNT | 6 |  |  |  |  |  |

FIG.8

| BRAKE | ISOLATE | OK | OK | OK | OK | ISOLATE |
| TRACTION | OK | OFFLINE | OK | OK | OK | OK |
| HVAC | HEATING | STOP | COOLING | STOP | HEATING | STOP |
| PEI | OK | FAIL | OK | OK | FAIL | OK |

|  | M001 | M002 | M003 | M004 | M005 | M006 |
|---|---|---|---|---|---|---|
| BRAKE | 1 | 0 | 0 | 0 | 0 | 1 |
| TRACTION | 0 | 1 | 0 | 0 | 0 | 0 |
| HVAC | 1 | 0 | 2 | 0 | 1 | 0 |
| PEI | 0 | 1 | 0 | 0 | 1 | 0 |
| VEHICLE COUNT | 6 | | | | | |

FIG.10

|  | | VEHICLE COUNT | ITEM NAME |
|---|---|---|---|
| DOOR L1 | car | | doorStatus.doorL1 |
| DOOR L2 | car | | doorStatus.doorL2 |
| DOOR R1 | car | | doorStatus.doorR1 |
| DOOR R2 | car | | doorStatus.doorR2 |
| VEHICLE COUNT | train | | trainStatus.vehicleCount |

|  | CAR 1 | CAR 2 | CAR 3 | CAR 4 | CAR 5 | CAR 6 |
|---|---|---|---|---|---|---|
| DOOR L1 | (1) | (2) | (3) | (4) | (5) | (6) |
| DOOR L2 | | | | | | |
| DOOR R1 | | | | | | |
| DOOR R2 | | | | | | |
| VEHICLE COUNT | (7) | | | | | |

1. WHEN LEFT END IS SET AS FIRST CAR
(1) car[1].doorStatus.doorL1
(2) car[2].doorStatus.doorL1
(3) car[3].doorStatus.doorL1
(4) car[4].doorStatus.doorL1
(5) car[5].doorStatus.doorL1
(6) car[6].doorStatus.doorL1
(7) train.trainStatus.vehicleCount 2. WHEN LEFT END IS SET AS SIXTH CAR
(1) car[6].doorStatus.doorL1
(2) car[5].doorStatus.doorL1
(3) car[4].doorStatus.doorL1
(4) car[3].doorStatus.doorL1
(5) car[2].doorStatus.doorL1
(6) car[1].doorStatus.doorL1
(7) train.trainStatus.vehicleCount

FIG.12

|  |  | VEHICLE COUNT | ITEM NAME |
|---|---|---|---|
| BRAKE | car |  | brake |
| TRACTION | car |  | traction |
| HVAC | car |  | hvac |
| PEI | car |  | pei |
| VEHICLE COUNT | train | / | trainStatus.vehicleCount |

|  | CAR 1 | CAR 2 | CAR 3 | CAR 4 | CAR 5 | CAR 6 |
|---|---|---|---|---|---|---|
| BRAKE | (1) | (2) | (3) | (4) | (5) | (6) |
| TRACTION |  |  |  |  |  |  |
| HVAC |  |  |  |  |  |  |
| PEI |  |  |  |  |  |  |
| VEHICLE COUNT | (7) |  |  |  |  |  |

1. WHEN LEFT END IS SET AS FIRST CAR
(1) car[1].brake
(2) car[2].brake
(3) car[3].brake
(4) car[4].brake
(5) car[5].brake
(6) car[6].brake
(7) train.trainStatus.vehicleCount 2. WHEN LEFT END IS SET AS SIXTH CAR
(1) car[6].brake
(2) car[5].brake
(3) car[4].brake
(4) car[3].brake
(5) car[2].brake
(6) car[1].brake
(7) train.trainStatus.vehicleCount

DISPLAY DEVICE AND ON-BOARD INFORMATION DISPLAY METHOD

FIELD

The present invention relates to a display device mounted on a cab of a train and an on-board information display method.

BACKGROUND

A display device mounted on a driver's cab of a train displays the statuses and the like of devices mounted on cars on a display screen. Patent Literature 1 discloses a technique of automatically generating a display screen with changing the number of cars to be displayed depending on a train composition when the statuses and the like of devices mounted on the cars are displayed in a display device.

CITATION LIST

Patent Literature

Patent Literature 1: WO 2016/117025 A

SUMMARY

Technical Problem

However, according to the above conventional technique, the train composition may change in the number of cars due to addition or uncoupling of a car. Therefore, it is necessary to define car information or the like used for each train composition in consideration of such addition or decoupling. However, it has been impractical to beforehand define train composition information in consideration of all train compositions. Further, if a combination of cars of a train composition is changed, information on the train composition must be updated each time it happens.

The present invention has been made in view of the above circumstances, and it is an object of the present invention to provide a display device capable of providing a display screen that displays a status of a device mounted on a car without defining information on a train composition.

Solution to Problem

In order to solve the above problem and achieve the object, the present invention is a display device mounted on a cab of a train. The display device has a drawing processing unit to display a status of a device mounted on a car of the train. The display device has a data collection unit comprising: a signal definition holding unit to hold a signal definition to be a base of a first signal for requesting information on a status of a device mounted on the car; a signal mapping management unit to acquire configuration information including information on the number of cars and a traveling direction of the train, and generate the first signal, based on the signal definition and the configuration information to request information on the status of the device; a signal data storage unit to hold a value of a second signal that is information on a status of the device acquired by the request of the signal mapping management unit; and a signal mapping generation unit to generate signal mapping information for specifying an arrangement of a car on a display screen on which a status of the device is to be displayed, based on the configuration information acquired from the signal mapping management unit, and output the signal mapping information to the signal data storage unit.

Advantageous Effects of Invention

According to the present invention, the display device has an advantageous effect that it is able to provide a display screen that displays a status of a device mounted on a car without defining information on a train composition.

BRIEF DESCRIPTION OF DRAWINGS

FIG. 8 is a diagram illustrating an example of a drawing part 3 displayed by the drawing processing execution unit of the train cab display device according to the first embodiment.

FIG. 9 is a diagram illustrating an example of a drawing table of the drawing part 3 held by the drawing data holding unit of the train cab display device according to the first embodiment.

FIG. 10 is a diagram illustrating an example of signal definitions for the drawing part 2 held by a signal definition holding unit of the train cab display device according to the first embodiment.

FIG. 11 is a diagram illustrating an example of a storage method when a signal data storage unit stores the values of second signals for the drawing part 2 in the drawing table of the drawing data holding unit in the train cab display device according to the first embodiment.

FIG. 12 is a diagram illustrating an example of signal definitions for the drawing part 3 held by the signal definition holding unit of the train cab display device according to the first embodiment.

FIG. 13 is a diagram illustrating an example of a storage method when the signal data storage unit stores the values of second signals for the drawing part 3 in the drawing table of the drawing data holding unit in the train cab display device according to the first embodiment.

DESCRIPTION OF EMBODIMENTS

Hereinafter, a display device and an on-board information display method according to embodiments of the present invention will be described in detail with reference to the drawings. Note that the present invention is not necessarily limited by these embodiments.

First Embodiment

Figure 1:
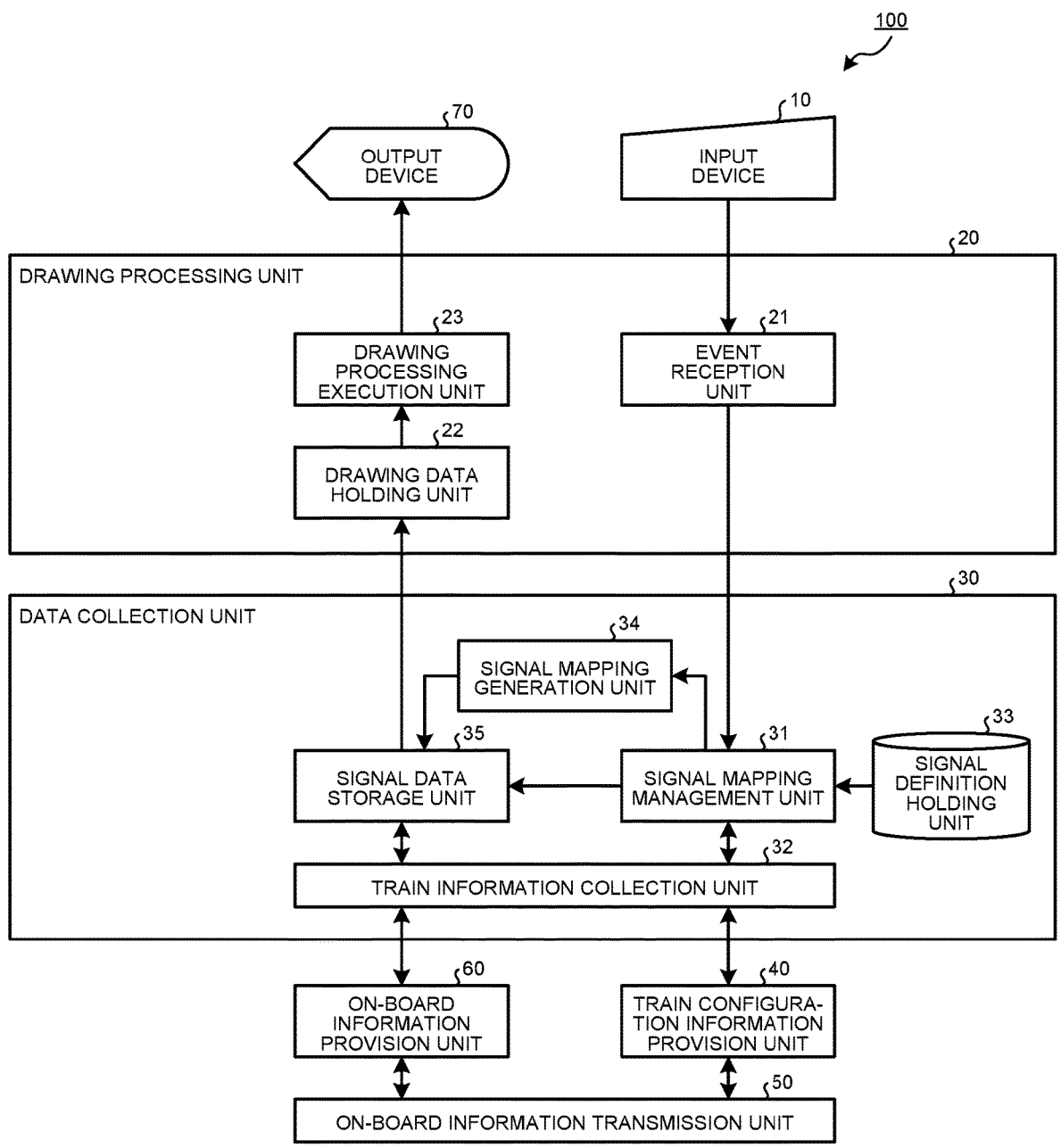
FIG. 1 is a block diagram illustrating a configuration example of a train cab display device according to a first embodiment.

FIG. 1 is a block diagram illustrating a configuration example of a train cab display device 100 according to a first embodiment of the present invention. The train cab display device 100 is a display device placed on a driver's cab of a train (not illustrated), for displaying on a display screen the statuses and the like of devices mounted on cars constituting the train. Examples of the devices mounted on each car include a door (DOOR), a BRAKE, a TRACTION, a Heating Ventilating Air Conditioning (HVAC), a Passenger Emergency Intercom (PEI), and more. In the following description, displaying a status of a device on the display screen by the train cab display device 100 may sometimes be expressed as drawing a status of a device on the display screen by the train cab display device 100.

The train cab display device 100 includes an input device 10, a drawing processing unit 20, a data collection unit 30, a train configuration information provision unit 40, an on-board information transmission unit 50, an on-board information provision unit 60, and an output device 70.

The input device 10 receives event information, for example, a request to display the statuses of the devices, from a user such as a driver. The input device 10 is, for example, a switch, but may be a keyboard, a mouse, and/or the like. Alternatively, the input device 10 may be combined with the output device 70 into a touch panel.

The data collection unit 30 includes a signal mapping management unit 31, a train information collection unit 32, a signal definition holding unit 33, a signal mapping generation unit 34, and a signal data storage unit 35.

The signal mapping management unit 31 acquires configuration information including information on the number of cars and the traveling direction of the train from the train information collection unit 32. The signal mapping management unit 31 generates a first signal based on a signal definition and the acquired configuration information, and outputs the generated first signal to the train information collection unit 32 to request information on the status of the device from the train information collection unit 32. The signal definition is the base of the first signal to request information on the status of the device mounted on the car, and is held by the signal definition holding unit 33. The signal mapping management unit 31 outputs the acquired configuration information to the signal mapping generation unit 34. The signal mapping management unit 31 outputs the number of cars, that is, the information on the number of cars to the signal data storage unit 35.

The train information collection unit 32 acquires train configuration information from the train configuration information provision unit 40, and then outputs the acquired configuration information to the signal mapping management unit 31. The train information collection unit 32 may request and acquire the configuration information from the train configuration information provision unit 40 when there is a request from the signal mapping management unit 31, or may request and acquire the configuration information periodically from the train configuration information provision unit 40. When the train information collection unit 32 acquires the first signal from the signal mapping management unit 31, the train information collection unit 32 requests information on the status of the device associated with the first signal from the on-board information provision unit 60. The train information collection unit 32 acquires a second signal that is a response to the first signal from the on-board information provision unit 60. The train information collection unit 32 outputs the value of the second signal acquired from the on-board information provision unit 60 to the signal data storage unit 35. The value of the second signal is information on the status of the device mounted on its own car and other cars.

The signal definition holding unit 33 holds the signal definitions to be the bases of the first signals to request information on the statuses of the devices mounted on the cars. The signal definitions are preset by a train operation manager or the like and held in the signal definition holding unit 33 in association with items of statuses of devices to be displayed on the output device 70 by the drawing processing unit 20.

The signal mapping generation unit 34 generates signal mapping information based on the configuration information acquired from the signal mapping management unit 31, and outputs the signal mapping information to the signal data storage unit 35. The signal mapping information is information to specify the order of the cars on the display screen of the output device 70 on which the statuses of the devices are displayed by the drawing processing unit 20. Specifically, the signal mapping information indicates on which side of the display screen the front car or the rear car of the cars included in the train composition be disposed, for example, the left side or the right side of the display screen.

The signal data storage unit 35 holds the values of the second signals acquired from the train information collection unit 32 upon the request of the signal mapping management unit 31. Based on the signal mapping information acquired from the signal mapping generation unit 34, the signal data storage unit 35 controls the storage positions of the values of the second signals in the drawing processing unit 20, or specifically a drawing data holding unit 22, which is described later, to store the values of the second signals in the drawing data holding unit 22.

The drawing processing unit 20 includes an event reception unit 21, the drawing data holding unit 22, and a drawing processing execution unit 23.

The event reception unit 21 outputs event information received by the input device 10 from the user to the data collection unit 30.

The drawing data holding unit 22 holds drawing data that is the values of the second signals stored by the data collection unit 30 in drawing tables formed in units of drawing parts into which display contents displayed on the display screen are transformed.

The drawing processing execution unit 23 displays the statuses of the devices on the display screen of the output device 70 using a plurality of drawing parts, based on the drawing data held in the drawing tables of the drawing data holding unit 22.

The train configuration information provision unit 40 outputs the configuration information to the train information collection unit 32 upon the request from the train information collection unit 32. Here, the on-board information transmission unit 50 is mounted on each of the cars constituting the train. From the contents of signals from the on-board information transmission units 50 mounted on the other cars acquired from the on-board information transmission unit 50, the train configuration information provision unit 40 can recognize the number of on-board information transmission units 50 in the train, that is, the number of cars of the train. Since the on-board information transmission unit 50 mounted on the front car in the traveling direction of the train outputs a usage state of the cab or the like to the on-board information transmission units 50 on the other cars, the train configuration information provision unit 40 that has acquired information on the usage state of the cab via the on-board information transmission unit 50 can recognize the traveling direction of the train. The train configuration information provision unit 40 generates configuration information including information on the number of cars and the traveling direction of the train, and outputs the configuration information to the train information collection unit 32.

The on-board information transmission unit 50 is mounted on each of the cars constituting the train, and acquires information on the statuses of the devices mounted on the other cars and other information via the on-board information transmission units 50 mounted on the other cars. The on-board information transmission unit 50 acquires information on the statuses of the devices mounted on its own car and other information. The on-board information transmission unit 50 outputs the information on the statuses of the devices mounted on its own car and other information to the on-board information transmission units 50 mounted on the other cars.

When the on-board information provision unit 60 acquires a first signal from the train information collection unit 32, the on-board information provision unit 60 acquires a second signal that is information on the status of a device mounted on its own car or another car, which is in response to the first signal, via the on-board information transmission unit 50, and outputs the second signal to the train information collection unit 32. The on-board information provision unit 60 performs the same processing on all of the first signals, acquires second signals responsive to the first signals, and outputs the second signals to the train information collection unit 32.

The output device 70 is a display unit in which the statuses of the devices are displayed on the display screen under the control of the drawing processing execution unit 23 of the drawing processing unit 20. The output device 70 is, for example, a monitor equipped with a Liquid Crystal Display (LCD) or the like. Alternatively, as described above, the output device 70 may be combined with the input device 10 into a touch panel.

To display the statuses of the devices on the display screen of the output device 70, the train cab display device 100 performs drawing processing using a plurality of drawing parts into which display contents displayed on the display screen are transformed. An outline of the train cab display device 100 performing the drawing processing using the plurality of drawing parts will be described.

Figure 2:
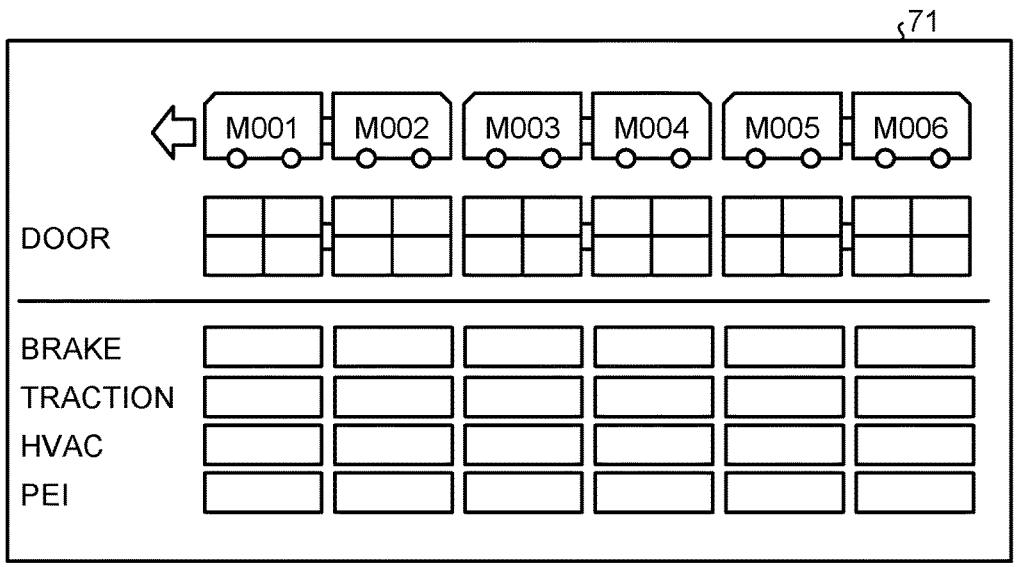
FIG. 2 is a diagram illustrating an example of a display configuration when the train cab display device according to the first embodiment displays the statuses of devices on a display screen of an output device.

FIG. 2 is a diagram illustrating an example of a display configuration when the train cab display device 100 according to the first embodiment displays the statuses of the devices on the display screen 71 of the output device 70. Assume a case where the train is composed of six cars in FIG. 2 as an example. As illustrated in FIG. 2, the train cab display device 100 shows the traveling direction using an arrow together with the six cars corresponding to the train composition, on the display screen 71 of the output device 70. The train cab display device 100 displays, on the display screen 71 of the output device 70, the open/closed statuses of the doors mounted on each car as the statuses of devices. One example shown in FIG. 2 is based on the assumption that each car has four doors in total, two doors for each of the left and right sides of the care. The train cab display device 100 displays on the display screen 71 of the output device 70, the usage statuses or failure statuses of the BRAKE, TRACTION, HVAC, and PEI as the statuses of devices.

Figure 3:
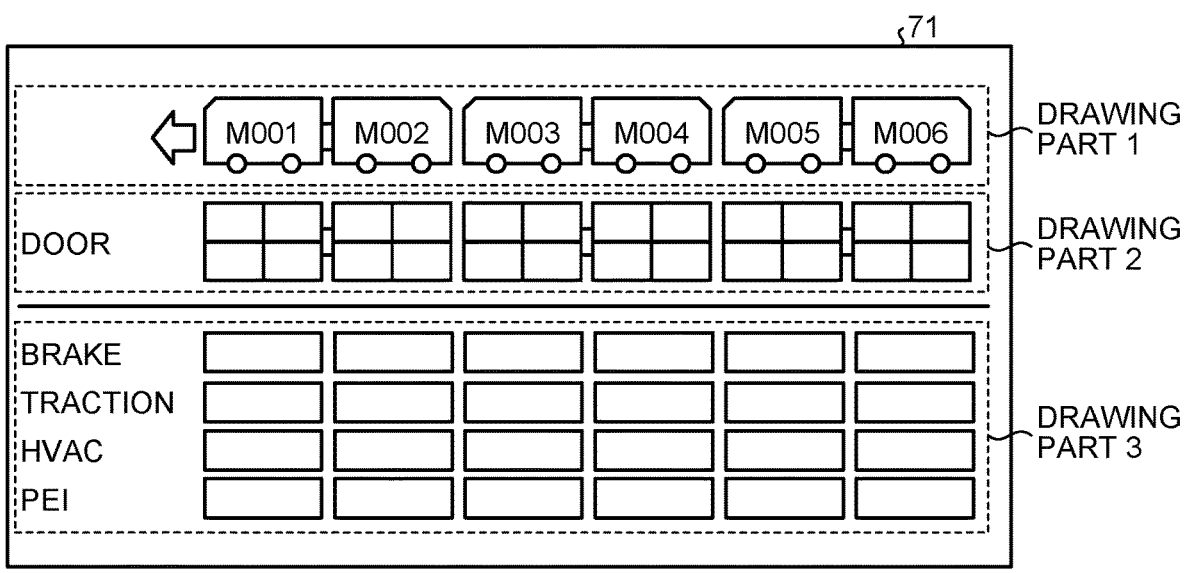
FIG. 3 is a diagram illustrating an example where the display screen displayed on the output device by the train cab display device according to the first embodiment is separated into a plurality of drawing parts.

In the train cab display device 100, the drawing processing unit 20 performs control to display the display screen 71 illustrated in FIG. 2 not as one unified portion but as a plurality of drawing parts into which the display screen 71 is transformed. FIG. 3 is a diagram illustrating an example where the display screen 71 displayed on the output device 70 by the train cab display device 100 according to the first embodiment is transformed into a plurality of drawing parts. In FIG. 3, the display screen 71 illustrated in FIG. 2 is composed of three drawing parts as an example. A drawing part 1 shows the status of the train composition. A drawing part 2 shows the statuses of the doors. A drawing part 3 shows the statuses of the BRAKEs, TRACTIONS, HVACs, and PEIs. As illustrated in FIG. 3, contents displayed on the display screen 71 are separated into parts with a drawing group of the six cars for the train composition being regarded as one drawing part, that is, on a train by train basis.

The drawing data holding unit 22 of the drawing processing unit 20 holds drawing data in a table format in which a row direction represents cars and a column direction represents the attributes of the cars for each drawing part. The drawing processing execution unit 23 executes the drawing processing based on the drawing data held by the drawing data holding unit 22, and performs display with the display screen 71 as illustrated in FIGS. 2 and 3.

For the drawing data holding unit 22 to hold the drawing data in a table format for each drawing part, the signal definition holding unit 33 of the data collection unit 30 defines allocation of signals to the drawing part, or signal information for an attribute of each car, that is, for each column of the drawing table. Note that the number of rows, that is, the number of cars is determined by the train configuration information acquired by the data collection unit 30. To acquire second signals necessary for storing drawing data in the drawing table of each drawing part, the signal mapping management unit 31 generates first signals for each car, using the signal definitions for the attribute of the car, that is, for each column of the drawing table. For example, to obtain drawing data necessary for the drawing table corresponding to the drawing part 3 illustrated in FIG. 3, the signal mapping management unit 31 generates first signals to obtain second signals on the BRAKEs, TRACTIONS, HVACs, and PEIs for the six cars.

When the train cab display devices 100 are mounted on the front car of the train where the driver is in and the rear-end car of the train where the conductor is in, a display pattern, that is, the order of the cars may be changed for display in the cars. For example, in each of the front car and the rear car, the train cab display device 100 may position its own car on which the device 100 is mounted, on the left side of the display screen 71 for display. In this case, information sets themselves on the statuses of the devices displayed on the display screens 71 of the train cab display devices 100 are equal between the front car and the rear car, but the front car and the rear car are displayed with their right sides and left sides being reversed. In the examples of FIGS. 2 and 3, when the train cab display device 100 of the front car where the driver is in displays the information in the orientation illustrated in FIGS. 2 and 3, that is, with the car denoted by "M001" positioned on the left, the train cab display device 100 of the rear car where the conductor is in displays the information in the orientation opposite to that of FIGS. 2 and 3, that is, with the car denoted by "M006" positioned on the left.

In the same train, the train cab display device 100 of the front car and the train cab display device 100 of the rear car acquire the same second signals and hold the values of the second signals in the same order on the stage of their signal data storage units 35. However, the signal data storage unit 35 of one train cab display device 100 stores the values of the second signals in the drawing data holding unit 22 in the same order, and the signal data storage unit 35 of the other train cab display device 100 stores the values of the second signals in the drawing data holding unit 22 with their order being changed. To change the order means that the signal data storage unit 35 of the other train cab display device 100, which holds the values of the second signals on the devices in the order of the sequence of the cars M001, M002, . . . , M006 from the left, for example, changes the order into the sequence of the cars M006, M005, . . . , M001 from the left, and accordingly stores the values of the second signals on the devices in the drawing data holding unit 22.

In the train cab display device 100, the signal mapping generation unit 34 generates signal mapping information that is mapping information indicating whether or not to change the order when storing the second signals acquired from the devices to be displayed, in the tables of the drawing data holding unit 22, based on the train configuration information. Based on the signal mapping information, the signal data storage unit 35 stores the values of the second signals acquired from the train information collection unit 32 in the drawing data holding unit 22.

More specifically, description is given for the drawing parts displayed on the display screen 71 of the output device 70 by the drawing processing execution unit 23 of the train cab display device 100, and at the same time, the drawing data held in the drawing tables for each drawing part by the drawing data holding unit 22.

Figures 4, 5:
FIG. 4 is a diagram illustrating an example of a drawing part 1 displayed by a drawing processing execution unit of the train cab display device according to the first embodiment.
FIG. 5 is a diagram illustrating an example of a drawing table of the drawing part 1 held by a drawing data holding unit of the train cab display device according to the first embodiment.

FIG. 4 is a diagram illustrating an example of the drawing part 1 displayed by the drawing processing execution unit 23 of the train cab display device 100 according to the first embodiment. In the drawing part 1 of FIG. 4, a solid arrow indicates that the traveling direction of the train is leftward. FIG. 4 illustrates an example where the front car is the M001 car, and the train cab display device 100 mounted on the front car displays its own car while the car is situated on the left. In the case where the same train is changed in traveling direction, when the rear car is the M001 car and the train cab display device 100 mounted on the rear car displays its own care while the car is situated on the left, the traveling direction of the train is an arrow of a dotted line. In the drawing part 1 of FIG. 4, the display method is changed depending on the presence or absence of a failure, and it is shown that the M003 and M006 cars have failures. Examples of changing the display method include a method of changing a displayed color, but other methods may be used.

FIG. 5 is a diagram illustrating an example of a drawing table 22*a* of the drawing part 1 held by the drawing data holding unit 22 of the train cab display device 100 according to the first embodiment. In the drawing table 22*a* of the drawing part 1 illustrated in FIG. 5, drawing data sets for six cars are held. In FIG. 5, in an item of failure presence/absence, drawing data on a car having a failure is "1", and drawing data on a car not having a failure is "0". In FIG. 5, for an item of vehicle count, the drawing data is "6" representing the actual number of cars. In FIG. 5, for an item of a traveling direction, the drawing data is "0" representing the left. In the example of FIG. 5, the drawing data to represent the right for the item of a traveling direction is "1".

Based on the drawing data in the drawing table 22*a* illustrated in FIG. 5 held by the drawing data holding unit 22, the drawing processing execution unit 23 displays the drawing part 1 for the six-car train illustrated in FIG. 4 on the display screen 71.

Figures 6, 7:
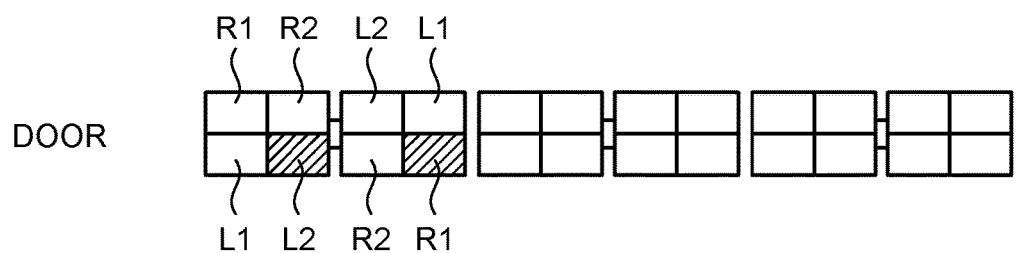
FIG. 6 is a diagram illustrating an example of a drawing part 2 displayed by the drawing processing execution unit of the train cab display device according to the first embodiment.
FIG. 7 is a diagram illustrating an example of a drawing table of the drawing part 2 held by the drawing data holding unit of the train cab display device according to the first embodiment.

FIG. 6 is a diagram illustrating an example of the drawing part 2 displayed by the drawing processing execution unit 23 of the train cab display device 100 according to the first embodiment. The drawing part 2 in FIG. 6 shows that an L2 door of the M001 car of the M001 to M006 cars is open, and an R1 door of the M002 car is open. The drawing part 2 in FIG. 6 shows that the other doors are closed. Note that information on the status of a door may be information on the presence or absence of a failure other than an open/closed status.

FIG. 7 is a diagram illustrating an example of a drawing table 22*b* of the drawing part 2 held by the drawing data holding unit 22 of the train cab display device 100 according to the first embodiment. In the drawing table 22*b* of the drawing part 2 illustrated in FIG. 7, drawing data sets for six cars are held. In FIG. 7, in items of door L1, door L2, door R1, and door R2, the drawing data is "1" when a door is open, and is "0" when a door is closed. In FIG. 7, for an item of vehicle count, the drawing data is "6" representing the actual number of cars.

Based on the drawing data in the drawing table 22b illustrated in FIG. 7 held by the drawing data holding unit 22, the drawing processing execution unit 23 displays the drawing part 2 for the doors of the six-car train illustrated in FIG. 6 on the display screen 71.

FIG. 8 is a diagram illustrating an example of the drawing part 3 displayed by the drawing processing execution unit 23 of the train cab display device 100 according to the first embodiment. The drawing part 3 in FIG. 8 shows the operating statuses and the like of the devices mounted on the M001 to M006 cars.

FIG. 9 is a diagram illustrating an example of a drawing table 22c of the drawing part 3 held by the drawing data holding unit 22 of the train cab display device 100 according to the first embodiment. In the drawing table 22c of the drawing part 3 illustrated in FIG. 9, drawing data sets for six cars are held. In FIG. 9, in an item of BRAKE, the drawing data on a car in an "ISOLATE" status is "1", and the drawing data on a car operating normally is "0". In FIG. 9, in an item of TRACTION, the drawing data on a car that is "ON" is "0", and the drawing data on a car that is "OFFLINE" is "1". In FIG. 9, in an item of HVAC, the drawing data on a car in heating (HEATING) is "1", the drawing data on a car in cooling (COOLING) is "2", and the drawing data on a car not in air-conditioning operation (STOP) is "0". In FIG. 9, in an item of PEI, the drawing data on a car on which a device for urgent display is not operating (FAIL) is "1", and the drawing data on a car on which the device is operating is "0". In FIG. 9, for an item of vehicle count, the drawing data is "6" representing the actual number of cars.

Based on the drawing data in the drawing table 22c illustrated in FIG. 9 held by the drawing data holding unit 22, the drawing processing execution unit 23 displays, on the display screen 71, the drawing part 3 about the devices including the BRAKEs of the six-car train illustrated in FIG. 8.

The next description is given for signal definitions held by the signal definition holding unit 33, first signals generated by the signal mapping management unit 31, and the values of second signals stored in the drawing data holding unit 22.

FIG. 10 is a diagram illustrating an example of the signal definitions for the drawing part 2 held by the signal definition holding unit 33 of the train cab display device 100 according to the first embodiment.

The example of FIG. 10 shows that the signal mapping management unit 31 uses the signal definition "trainStatus.vehicleCount" when generating a first signal for acquiring information on the number of cars of the train of the train configuration information. The signal mapping management unit 31 generates the signal "train.trainStatus.vehicleCount" as a first signal to obtain a second signal on the number of cars from the train configuration information provision unit 40 via the train information collection unit 32. The signal mapping management unit 31 outputs the generated first signal to the train information collection unit 32 to request information on the number of cars from the train information collection unit 32. Upon acquiring the first signal from the signal mapping management unit 31, the train information collection unit 32 acquires information on the number of cars from the train configuration information provision unit 40, and outputs the information on the number of cars to the signal mapping management unit 31 as a second signal that is a response to the first signal. The signal mapping management unit 31 acquires the second signal that is a response to the first signal from the train information collection unit 32, and holds the value of the second signal. Here, the value of the second signal is "6" representing a six-car composition.

Though not shown in FIG. 10, when acquiring information on the number of cars of the train, the signal mapping management unit 31 acquires the information together with information on the traveling direction of the train as train configuration information from the train configuration information provision unit 40 via the train information collection unit 32. Here, for explanatory convenience, only the information on the number of cars of the train of the configuration information will be described.

The example of FIG. 10 also shows that the signal mapping management unit 31 uses the signal definition "doorStatus.doorL1" when generating a first signal for acquiring information on the status of the door L1 from each car. As described above, the signal mapping management unit 31 has determined, from the information on the number of cars of the train, that the train is composed of six cars. The signal mapping management unit 31 generates the signal "car[1].doorStatus.doorL1" as a first signal to obtain a second signal on the door L1 of the car M001 from the on-board information provision unit 60 via the train information collection unit 32. The signal mapping management unit 31 outputs the generated first signal to the train information collection unit 32 to request information on the status of the door L1 of the car M001 from the train information collection unit 32. Upon acquiring the first signal from the signal mapping management unit 31, the train information collection unit 32 acquires information on the door L1 of the car M001 from the on-board information provision unit 60, and outputs the information on the door L1 of the car M001 to the signal data storage unit 35 as a second signal that is a response to the first signal.

The signal data storage unit 35 acquires the second signal that is a response to the signal "car[1].doorStatus.doorL1", that is, the first signal from the train information collection unit 32, and holds the value of the second signal. The data collection unit 30 of the train cab display device 100 acquires information on the statuses of the door L2, the door R1, and the door R2 in the same way, and holds the information as the values of second signals in the signal data storage unit 35. For first signals, for example, a first signal on the door L2 of the car M001 is set to "car[1].doorStatus.doorL2", and a first signal on the door L1 of the car M002 is set to "car[2].doorStatus.doorL1". The signal mapping management unit 31 makes numbers in brackets correspond to the car numbers to thereby generate different first signals for the doors of the cars. The signal mapping management unit 31 generates twenty-four first signals to obtain information on the statuses of the four doors from the six cars.

FIG. 11 is a diagram illustrating an example of a storage method when the signal data storage unit 35 stores the values of second signals for the drawing part 2 in the drawing table 22b of the drawing data holding unit 22 in the train cab display device 100 according to the first embodiment. This example is based on the assumption that the train cab display devices 100 are mounted on the front car and the rear car, and the train cab display device 100 of the front car and the train cab display device 100 of the rear car display the train in their respective different orientations. In one example, the front car is the M001 car, and the rear car is the M006 car. In the train cab display device 100 of the M001 car, the signal data storage unit 35 stores the values of the second signals illustrated in (1) to (6) in the order "1. When left end is set as first car" in the drawing table 22b of the drawing data holding unit 22. On the other hand, in the train cab display device 100 of the M006 car, the signal data storage unit 35 stores the values of the second signals illustrated in (1) to (6) in the order "2. When left end is set as sixth car" in the drawing table 22*b* of the drawing data holding unit 22.

As described above, in the train cab display device 100 of the front car and the train cab display device 100 of the rear car, their drawing data holding units 22 hold the drawing data in their respective different orders of the cars, with the left and the right reversed in the example of FIG. 11. For information on vehicle count (7), in both the train cab display device 100 of the front car and the train cab display device 100 of the rear car, their signal data storage units 35 store the information in a specified position in the drawing data holding units 22.

The signal data storage unit 35 stores the values of the second signals in the drawing data holding unit 22 by the method illustrated in FIG. 11, whereby the drawing data holding unit 22 can hold the drawing data on the drawing part 2 illustrated in FIG. 7.

FIG. 12 is a diagram illustrating an example of the signal definitions for the drawing part 3 held by the signal definition holding unit 33 of the train cab display device 100 according to the first embodiment. In FIG. 12, the "trainStatus.vehicleCount" is handled in the same manner as in FIG. 10.

The example in FIG. 12 shows that the signal mapping management unit 31 uses the signal definition "brake" when generating a first signal for acquiring information on the status of the BRAKE from each car. As described above, the signal mapping management unit 31 has recognized, from the information on the number of cars of the train, that the train is composed of six cars. The signal mapping management unit 31 generates the signal "car[1].brake" as a first signal to obtain a second signal on the BRAKE of the car M001 from the on-board information provision unit 60 via the train information collection unit 32. The signal mapping management unit 31 outputs the generated first signal to the train information collection unit 32 to request information on the status of the BRAKE of the car M001 from the train information collection unit 32. Upon acquiring the first signal from the signal mapping management unit 31, the train information collection unit 32 acquires information on the BRAKE of the car M001 from the on-board information provision unit 60, and outputs the information on the BRAKE of the car M001 to the signal data storage unit 35 as a second signal that is a response to the first signal.

The signal data storage unit 35 acquires the second signal that is a response to the signal "car[1].brake", that is, the first signal from the train information collection unit 32, and stores the value of the second signal. The data collection unit 30 of the train cab display device 100 acquires information on the statuses of the TRACTION, HVAC, and PEI in the same way, and stores the information as the values of second signals in the signal data storage unit 35. For first signals, for example, a first signal on the TRACTION of the car M001 is set to "car[1].traction", and a first signal on the BRAKE of the car M002 is set to "car[2].brake". The signal mapping management unit 31 makes numbers in brackets correspond to the car numbers to generate respective different first signals for the devices of the cars. The signal mapping management unit 31 generates twenty-four first signals to obtain information on the statuses of the four devices from the six cars.

FIG. 13 is a diagram illustrating an example of a storage method when the signal data storage unit 35 stores the values of second signals for the drawing part 3 in the drawing table 22*c* of the drawing data holding unit 22 in the train cab display device 100 according to the first embodiment. As in FIG. 11, this example is based on the assumption that the train cab display devices 100 are mounted on the front car and the rear car, and the train cab display device 100 of the front car and the train cab display device 100 of the rear car display the train in their respective different orientations. In one example, the front car is the M001 car, and the rear car is the M006 car. In the train cab display device 100 of the M001 car, the signal data storage unit 35 stores the values of the second signals illustrated in (1) to (6) in the order "1. When left end is set as first car" in the drawing table 22*c* of the drawing data holding unit 22. On the other hand, in the train cab display device 100 of the M006 car, the signal data storage unit 35 stores the values of the second signals illustrated in (1) to (6) in the order "2. When left end is set as sixth car" in the drawing table 22*c* of the drawing data holding unit 22.

As described above, in the train cab display device 100 of the front car and the train cab display device 100 of the rear car, their drawing data holding units 22 hold the drawing data in different orders of the cars, with the left and the right reversed in the example of FIG. 13. For information on vehicle count (7), in both the train cab display device 100 of the front car and the train cab display device 100 of the rear car, their signal data storage units 35 store the information in a specified position in the drawing data holding units 22.

The signal data storage unit 35 stores the values of the second signals in the drawing data holding unit 22 by the method illustrated in FIG. 13, whereby the drawing data holding unit 22 can hold the drawing data on the drawing part 3 illustrated in FIG. 9.

Note that the signal definitions corresponding to the drawing part 1 illustrated in FIG. 5 may not be held in the signal definition holding unit 33. For example, each car periodically transmits information on the operating status of the car from the on-board information transmission unit 50 of the car to the other car(s). The on-board information transmission unit 50 that has received the information on the operating statuses of the car from the other car(s) transmits the information on the operating status of the other car to the signal data storage unit 35 via the on-board information provision unit 60 and the train information collection unit 32. The signal data storage unit 35 uses the information on the operating statuses of the other cars as the values of second signals each indicating the presence or absence of a failure in the train, determines the order depending on whether to set the left end as the first car or set the left end as the sixth car in the same manner as in the case of FIGS. 11 and 13, and stores the values of the second signals in the drawing data holding unit 22.

Figure 14:
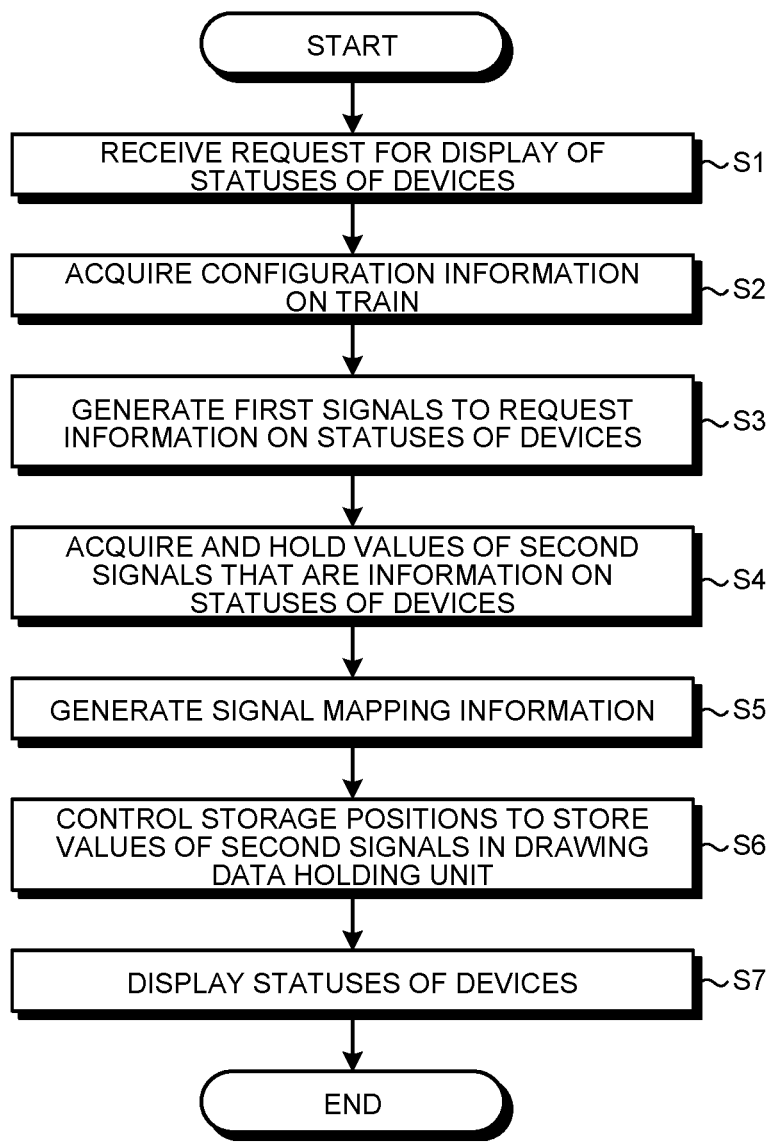
FIG. 14 is a flowchart illustrating the operation of the train cab display device according to the first embodiment to display the statuses of devices mounted on cars of a train.

The operation of the train cab display device 100 to display the statuses of the devices mounted on the cars of the train on the display screen 71 of the output device 70 will be described using a flowchart. FIG. 14 is a flowchart illustrating the operation of the train cab display device 100 according to the first embodiment to display the statuses of the devices mounted on the cars of the train. First, in the train cab display device 100, the input device 10 receives a request to display the statuses of the devices from the outside of the train cab display device 100, for example, a user (step S1). The input device 10 outputs information on an event for the request to display the statuses of the devices to the event reception unit 21. The event reception unit 21 outputs the information on an event for the request to display the statuses of the devices, to the signal mapping management unit 31.

Upon acquiring the information on an event for the request to display the statuses of the devices, the signal mapping management unit 31 acquires configuration information on the train from the train configuration information provision unit 40 via the train information collection unit 32 as described above (step S2).

The signal mapping management unit 31 generates first signals based on the signal definitions held in the signal definition holding unit 33 and the acquired configuration information, and outputs the first signals to the train information collection unit 32 to request information on the statuses of the devices mounted on the cars from the train information collection unit 32 (step S3). The signal mapping management unit 31 may receive a request to display the statuses of the devices from outside, that is, the input device 10 via the event reception unit 21, acquire configuration information, and generate first signals, or may acquire configuration information periodically from the train configuration information provision unit 40 via the train information collection unit 32, and generate first signals when there is a change in the configuration information.

The train information collection unit 32 requests information on the statuses of the devices mounted on the cars from the on-board information provision unit 60 to acquire the information on the statuses of the devices mounted on the cars from the on-board information provision unit 60. The train information collection unit 32 outputs the values of second signals that are the information on the statuses of the devices mounted on the cars, to the signal data storage unit 35. The signal data storage unit 35 holds the acquired values of the second signals (step S4).

The signal mapping management unit 31 outputs the configuration information to the signal mapping generation unit 34. Based on the configuration information, the signal mapping generation unit 34 generates signal mapping information for specifying the order of the cars on the display screen 71 on which the statuses of the devices are displayed (step S5). The signal mapping generation unit 34 outputs the generated signal mapping information to the signal data storage unit 35.

Based on the signal mapping information generated by the signal mapping generation unit 34, the signal data storage unit 35 controls the storage positions of the values of the second signals in the drawing data holding unit 22 to accordingly store the values of the second signals in the drawing data holding unit 22 (step S6).

The drawing processing execution unit 23 displays the statuses of the devices on the display screen 71 of the output device 70 using a plurality of drawing parts, based on drawing data held in the drawing tables of the drawing data holding unit 22 (step S7).

Next, the hardware configuration of the train cab display device 100 will be described. In the train cab display device 100, the input device 10 and the output device 70 are implemented by a touch panel. The on-board information transmission unit 50 is implemented by an interface circuit capable of communicating with the on-board information transmission units 50 of the other cars. The drawing processing unit 20, the data collection unit 30, the train configuration information provision unit 40, and the on-board information provision unit 60 are implemented by processing circuits. Specifically, the train cab display device 100 includes a processing circuit for generating first signals and obtaining the values of second signals that are information on the statuses of the devices mounted on the cars, controlling the storage positions to accordingly store the values of the second signals in the drawing tables of the drawing parts, and displaying the statuses of the devices using drawing data sets that are the values of the second signals stored in the drawing tables. The processing circuit may be a CPU that executes programs stored in a memory and the memory, or may be a dedicated hardware set therefor.

Figure 15:
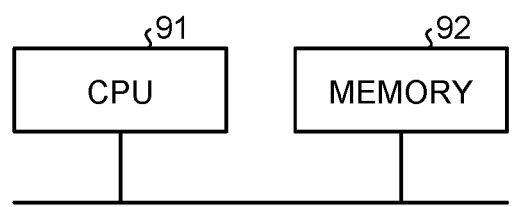
FIG. 15 is a diagram illustrating an example of a case where a processing circuit of the train cab display device according to the first embodiment is composed of a CPU and a memory.

FIG. 15 is a diagram illustrating an example of a case where the processing circuit for the train cab display device 100 according to the first embodiment is composed of a CPU and a memory. When the processing circuit is composed of a CPU 91 and a memory 92, the functions of the processing circuit for the train cab display device 100 are implemented by software, firmware, or a combination of software and firmware. Software or firmware is described as a program and stored in the memory 92. In the processing circuit, the CPU 91 reads out and executes the program stored in the memory 92, thereby implementing the functions. In other words, in the train cab display device 100, the processing circuit includes the memory 92 for storing programs that result in the execution of a step of generating first signals and acquiring the values of second signals that are information on the statuses of the devices mounted on the car, a step of controlling the storage positions and storing the values of the second signals in the drawing tables of the drawing parts, and a step of displaying the statuses of the devices using drawing data sets that are the values of the second signals stored in the drawing tables. These programs can be said to cause a computer to execute a procedure and a method in the train cab display device 100. Here, the CPU 91 may be a processing device, a calculation device, a microprocessor, a microcomputer, a processor, a Digital Signal Processor (DSP), or the like. The memory 92 corresponds, for example, to nonvolatile or volatile semiconductor memory such as a Random Access Memory (RAM), a Read Only Memory (ROM), a flash memory, an Erasable Programmable ROM (EPROM), or an Electrically EPROM (EEPROM) (registered trademark), or to a magnetic disk, a flexible disk, an optical disk, a compact disk, a mini disk, a Digital Versatile Disc (DVD), or the like.

Figure 16:
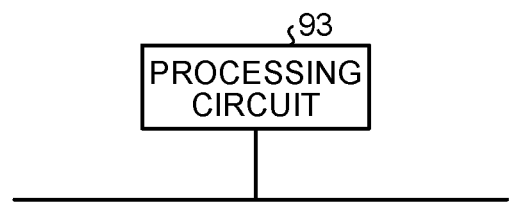
FIG. 16 is a diagram illustrating an example of a case where the processing circuit of the train cab display device according to the first embodiment is formed by dedicated hardware.

FIG. 16 is a diagram illustrating an example of a case where the processing circuit of the train cab display device 100 according to the first embodiment is formed by dedicated hardware. When the processing circuit is dedicated hardware, a processing circuit 93 illustrated in FIG. 16 corresponds, for example, to a single circuit, a composite circuit, a programmed processor, a parallel-programmed processor, an Application Specific Integrated Circuit (ASIC), a Field Programmable Gate Array (FPGA), or any combination of them. The functions of the train cab display device 100 may be implemented by the processing circuit 93 on an individual function basis, or the functions may be collectively implemented by the processing circuit 93.

Note that the functions of the train cab display device 100 may be implemented partly by dedicated hardware and partly by software or firmware. Thus, the processing circuit can implement the above-described functions based on dedicated hardware, software, firmware, or any combination of them.

As described above, according to the present embodiment, the train cab display device 100 generates first signals for requesting information on the statuses of devices mounted on the cars based on signal definitions to be the bases of the first signals and configuration information on the train to request information on the statuses of the devices, acquires the values of second signals that are information on the statuses of the devices, controls the storage positions of the values of the second signals in the drawing data holding unit 22 to accordingly store the values of the second signals in the drawing data holding unit 22, and based on drawing data held in the drawing tables of the drawing data holding unit 22, displays the statuses of the devices on the display screen 71 using a plurality of drawing parts. With this configuration, the train cab display device 100 can acquire the information on the statuses of the devices using information on the number of cars included in the acquired train configuration information, and thus can automatically generate the display screen 71 displaying the statuses of the devices mounted on the cars without defining information on a train composition. Even when the number of cars is changed due to addition or decoupling of a car in the train, or when the train reaches a terminal point and changes its traveling direction, the train cab display device 100 can automatically generate the display screen 71 displaying the statuses of the devices mounted on the cars in accordance with the statuses of the cars after the change.

Second Embodiment

In the first embodiment, one first signal corresponds to one piece of drawing data held in the drawing data holding unit 22. In a second embodiment, the values of a plurality of second signals obtained by a plurality of first signals are used to determine a new value of the second signal by calculation, and the new value of the second signal determined by the calculation is stored in the drawing data holding unit 22. Differences from the first embodiment will be described.

Figure 17:
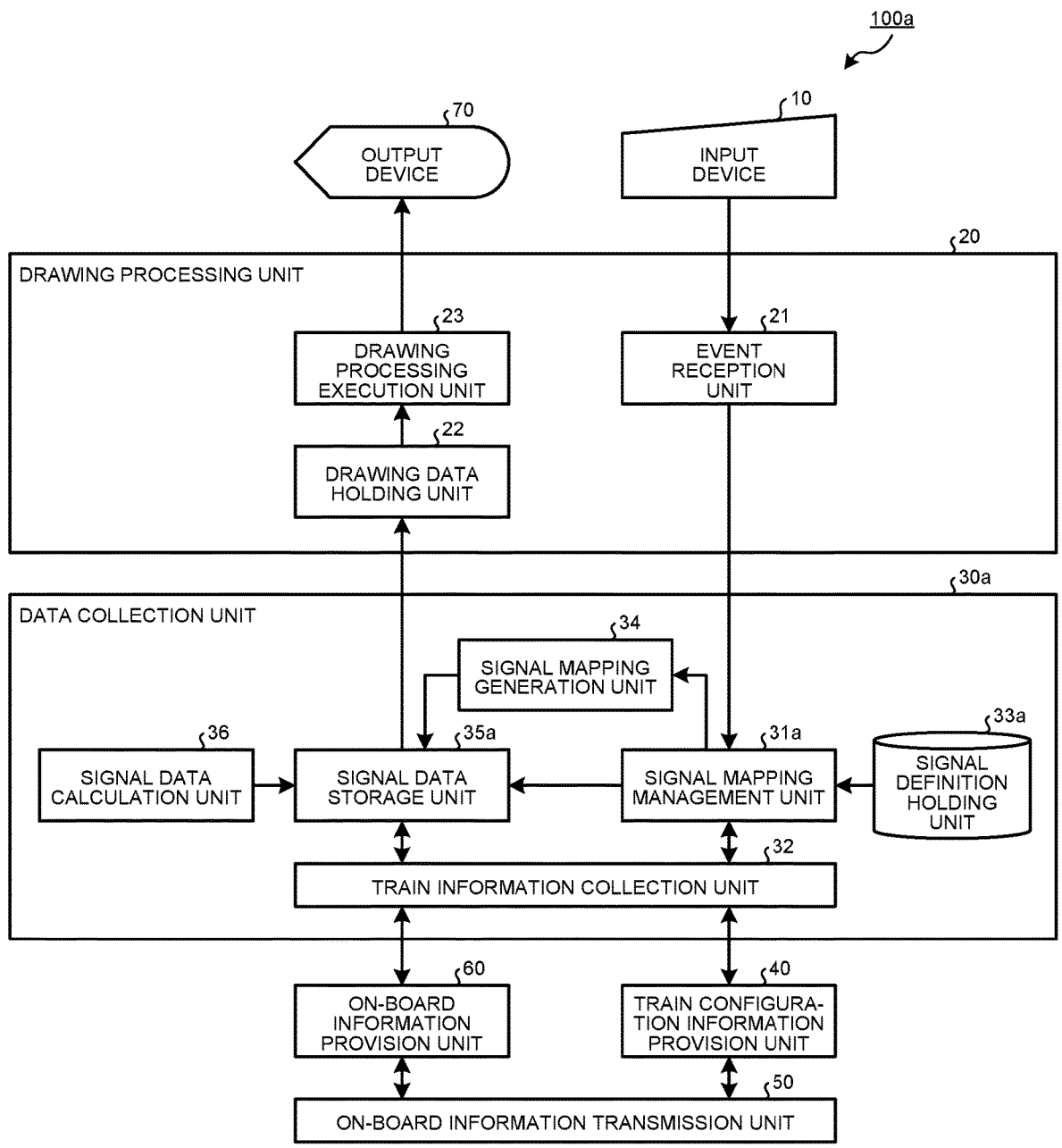
FIG. 17 is a block diagram illustrating a configuration example of a train cab display device according to a second embodiment.

FIG. 17 is a block diagram illustrating a configuration example of a train cab display device 100a according to the second embodiment. The train cab display device 100a includes a data collection unit 30a in place of the data collection unit 30 in the train cab display device 100 of the first embodiment. The data collection unit 30a includes a signal mapping management unit 31a, the train information collection unit 32, a signal definition holding unit 33a, the signal mapping generation unit 34, a signal data storage unit 35a, and a signal data calculation unit 36.

In addition to the signal definitions held by the signal definition holding unit 33, the signal definition holding unit 33a further holds information on an arithmetic expression for the signal data calculation unit 36 to calculate the new value of the second signal using the values of a plurality of second signals, and signal definitions to be the bases of first signals for obtaining the values of the plurality of second signals.

The signal mapping management unit 31a has the same function as the signal mapping management unit 31. However, in the unit 31a, the increased signal definitions held in the signal definition holding unit 33a result in correspondingly increased processing contents for generating the first signals, compared to the signal mapping management unit 31.

The signal data calculation unit 36 is a calculation unit that determines, by calculation, the new value of the second signal indicating one status of a specified device, using the values of a plurality of second signals.

The signal data storage unit 35a holds the new value of the second signal together with the plurality of second signals, and stores the new value of the second signal in the drawing data holding unit 22. Since the signal data storage unit 35a also holds the plurality of second signals for obtaining a new value of the second signal, an area for holding second signals is larger than that of the signal data storage unit 35.

In the drawing processing unit 20, the drawing processing execution unit 23 performs display based on the drawing tables of the drawing data holding unit 22. Some drawing data held in the drawing tables may not correspond, on a one-to-one basis, to the values of second signals acquired by the train information collection unit 32. For example, the status of a device may be determined from a combination of two or more second signals. The two or more second signals include, for example, a signal indicating whether or not the device is mounted, a signal indicating whether or not the status of the device is valid, and a signal representing the status of the device. To determine the status of a device from a combination of the two or more second signals, arithmetic processing is required in the train cab display device 100a.

Therefore, in the second embodiment, in addition to signal definitions to be the bases of first signals for obtaining second signals corresponding to drawing data, the signal definition holding unit 33a holds beforehand signal definitions to be the bases of first signals for obtaining a plurality of second signals to determine a new value of the second signal corresponding to drawing data in calculation. The signal definition holding unit 33a also holds beforehand information on an arithmetic expression for calculating a new value of the second signal using the values of the plural second signals.

The signal data calculation unit 36 determines whether or not to perform calculation from the signal definitions and the information on arithmetic expressions held in the signal definition holding unit 33a, and executes arithmetic processing as necessary and stores the calculation results, that is, new values of the second signals in the signal data storage unit 35a. The signal mapping management unit 31a outputs the signal definitions and the information on the arithmetic expressions, held in the signal definition holding unit 33a, to the signal data calculation unit 36 via the signal data storage unit 35a. The signal data calculation unit 36 determines a new value of the second signal in the calculation, whereby the train cab display device 100a can use a result of calculating a combination of a plurality of pieces of on-board information, that is, a plurality of pieces of information on the statuses of the plural devices, as drawing data.

Figure 18:
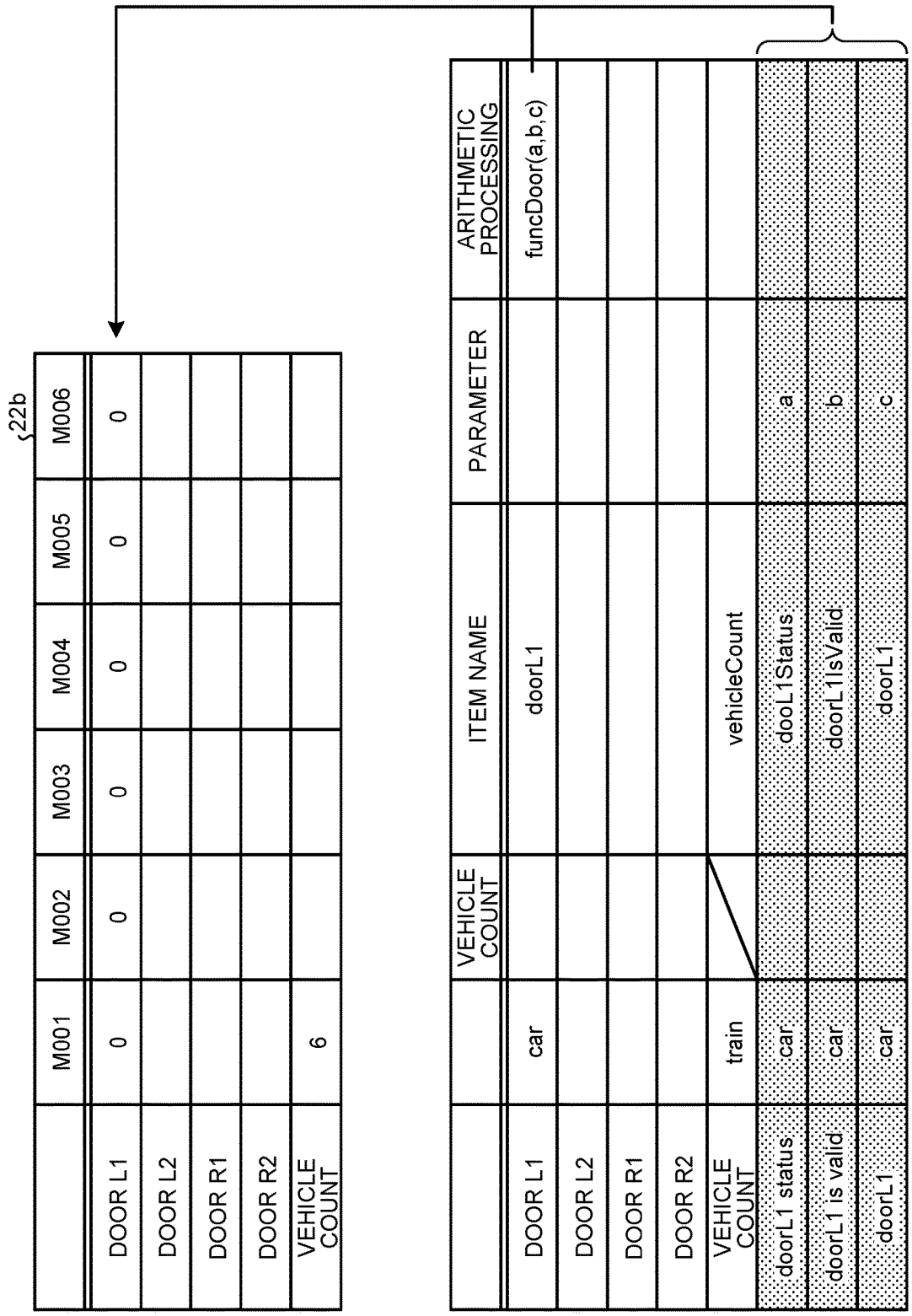
FIG. 18 is a diagram illustrating an example of the correspondence relationship between signal definitions held in a signal definition holding unit and drawing data held in a drawing table of a drawing data holding unit in the train cab display device according to the second embodiment.

FIG. 18 is a diagram illustrating an example of the correspondence relationship between signal definitions held in the signal definition holding unit 33a and drawing data held in the drawing table 22b of the drawing data holding unit 22 in the train cab display device 100a according to the second embodiment. FIG. 18 illustrates that to obtain drawing data to be held in the drawing table 22b of the drawing data holding unit 22, a new value of the second signal corresponding to the drawing data is determined by calculation of the values of three second signals. The example of FIG. 18 shows that to obtain the status of the door L1 of a car, a new value of the second signal indicating the status of the door L1 of the car is determined by the arithmetic expression "funcDoor(a,b,c)", using the values of three second signals obtained by three first signals based on the three signal definitions "doorL1Status", "doorL1IsValid", and "doorL1". FIG. 18 omits descriptions of the door L2, the door R1, and the door R2 as they are handled in the same manner as the door L1.

The signal data storage unit 35a handles a new value of the second signal determined by the calculation of the signal data calculation unit 36 in the same way as it handles the value of one second signal corresponding to one piece of drawing data, that is, in the same way as it handles the value of a second signal for the first embodiment. Even for a new value of the second signal, the signal data storage unit 35a controls the storage position of the value of the second signal in the drawing data holding unit 22, based on the signal mapping information, to accordingly store the value of the second signal in the drawing data holding unit 22.

Figure 19:
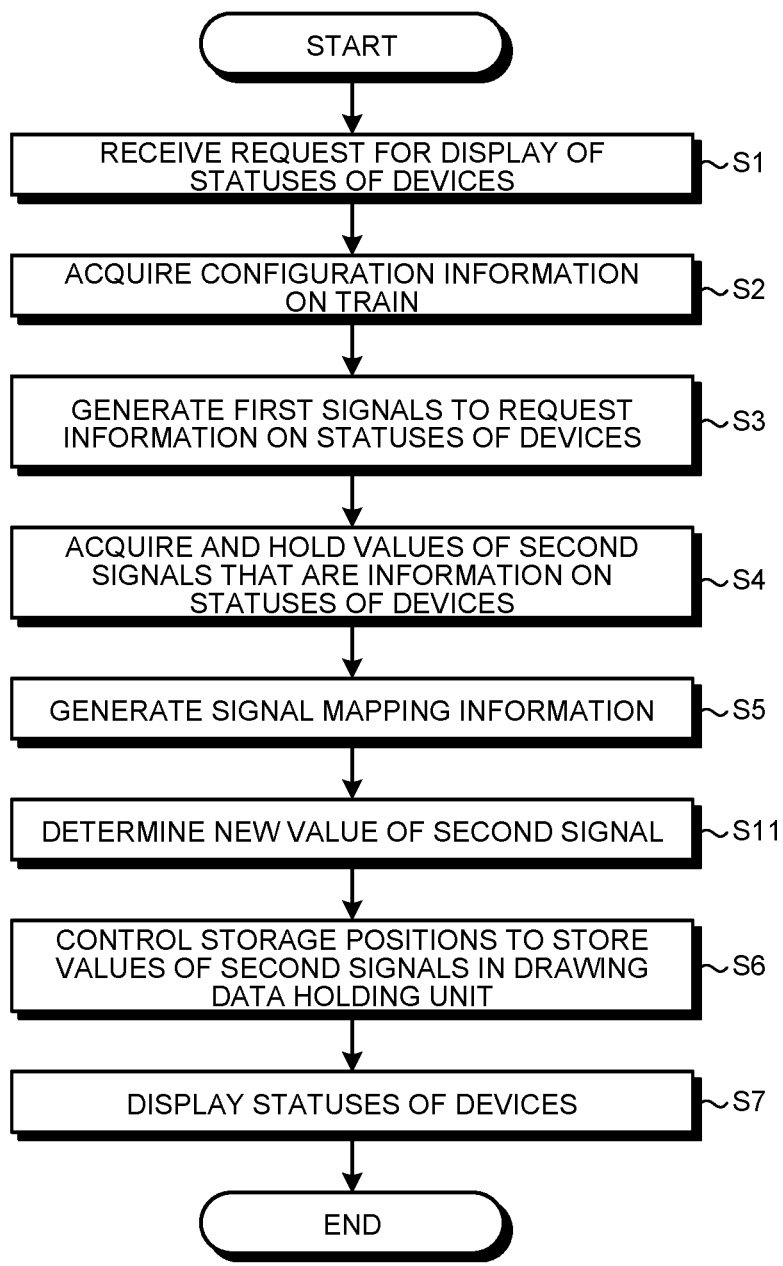
FIG. 19 is a flowchart illustrating the operation of the train cab display device according to the second embodiment to display the statuses of devices mounted on cars of a train.

FIG. 19 is a flowchart illustrating the operation of the train cab display device 100a according to the second embodiment to display the statuses of the devices mounted on the cars of the train. The operation from step S1 to step S5 is the same as that in the first embodiment.

Based on the signal definitions and the information on the arithmetic expressions held in the signal definition holding unit 33a, the signal data calculation unit 36 determines a new value of the second signal using the values of a plurality of second signals for which calculation is required, of the second signals held in the signal data storage unit 35a (step S11). The signal data calculation unit 36 stores a new value of the second signal determined by the calculation, in the signal data storage unit 35a.

The operation in steps S6 and S7 after step S11 is the same as that in the first embodiment.

The hardware configuration of the train cab display device 100a of the second embodiment is implemented by the same configuration as the hardware configuration of the train cab display device 100 of the first embodiment.

As described above, according to the present embodiment, the train cab display device 100a determines, by calculation, a new value of the second signal from the values of a plurality of second signals, and stores the new value of the second signal in the drawing data holding unit 22. By doing so, the train cab display device 100a can use the result of calculating a combination of a plurality of pieces of information on the statuses of the devices, as drawing data.

Third Embodiment

In the first and second embodiments, the signal data storage unit stores the values of second signals in the drawing data holding unit 22, whatever a value of the second signal is. In a third embodiment, the signal data storage unit changes the method of storing in the drawing data holding unit 22 depending on the value of a second signal. Differences from the first and second embodiments will be described.

Figure 20:
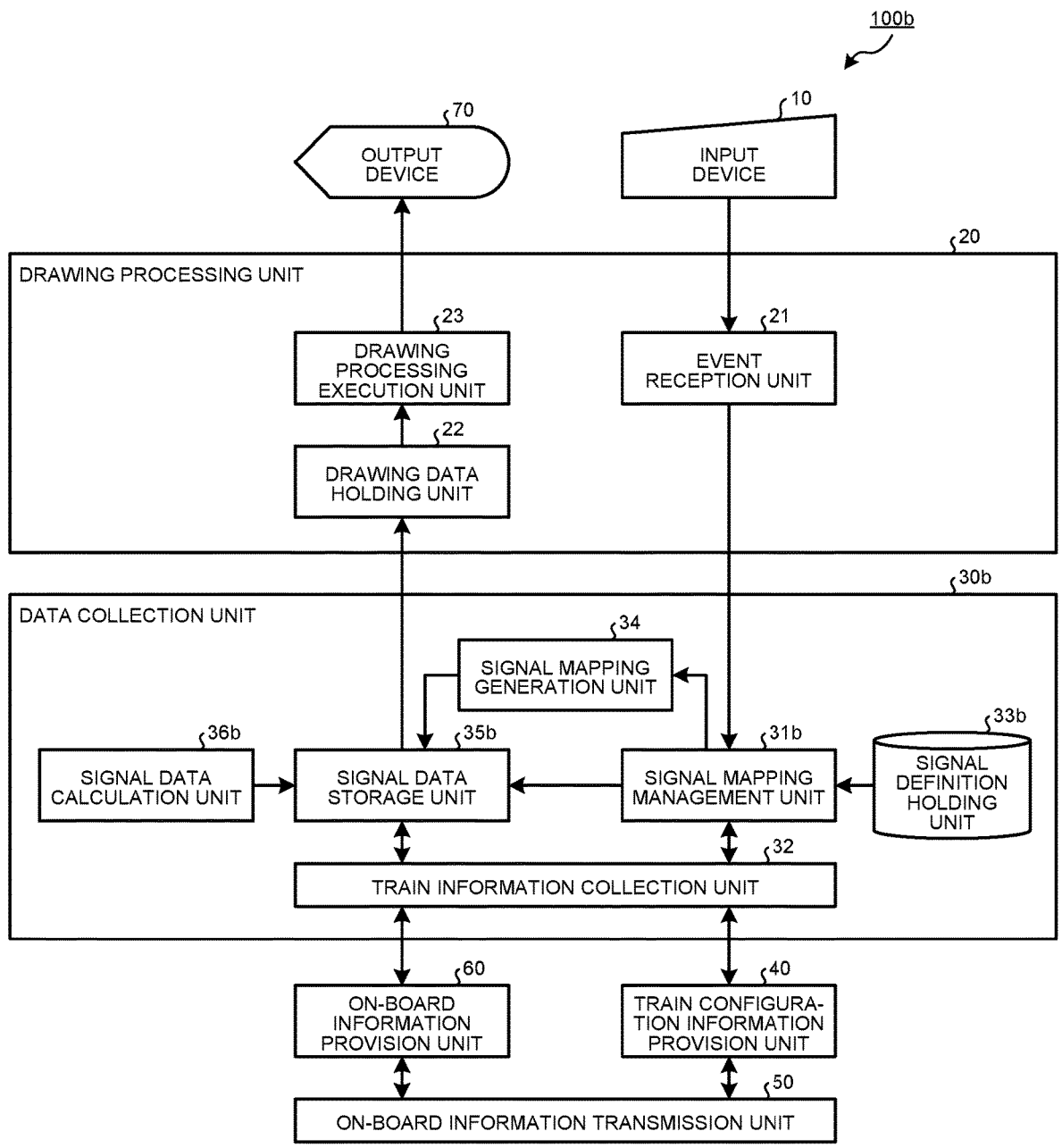
FIG. 20 is a block diagram illustrating a configuration example of a train cab display device according to a third embodiment.

FIG. 20 is a block diagram illustrating a configuration example of a train cab display device 100b according to the third embodiment. The train cab display device 100b includes a data collection unit 30b in place of the data collection unit 30 in the train cab display device 100 of the first embodiment. The data collection unit 30b includes a signal mapping management unit 31b, the train information collection unit 32, a signal definition holding unit 33b, the signal mapping generation unit 34, a signal data storage unit 35b, and a signal data calculation unit 36b.

In addition to the signal definitions held by the signal definition holding unit 33, the signal definition holding unit 33b further holds information on an arithmetic expression for the signal data calculation unit 36b to calculate a new value of the second signal using the values of a plurality of second signals, and signal definitions to be the bases of first signals for obtaining the values of the plurality of second signals.

The signal mapping management unit 31b has the same function as the signal mapping management unit 31. However, in the unit 31b, the increased signal definitions held in the signal definition holding unit 33b results in correspondingly increased processing contents for generating the first signals, compared to the signal mapping management unit 31.

The signal data calculation unit 36b is a calculation unit that determines a new value of the second signal indicating one status of a specified device, using the values of a plurality of second signals.

The signal data storage unit 35b holds a new value of the second signal together with the plurality of second signals, and changes the method of storing a new value of the second signal into the drawing data holding unit 22, based on the new value of the second signal.

In the third embodiment, the signal mapping management unit 31b and the signal data calculation unit 36b are the same in operation itself as the signal mapping management unit 31a and the signal data calculation unit 36 in the second embodiment, though some signals they handle are different.

Figure 21:
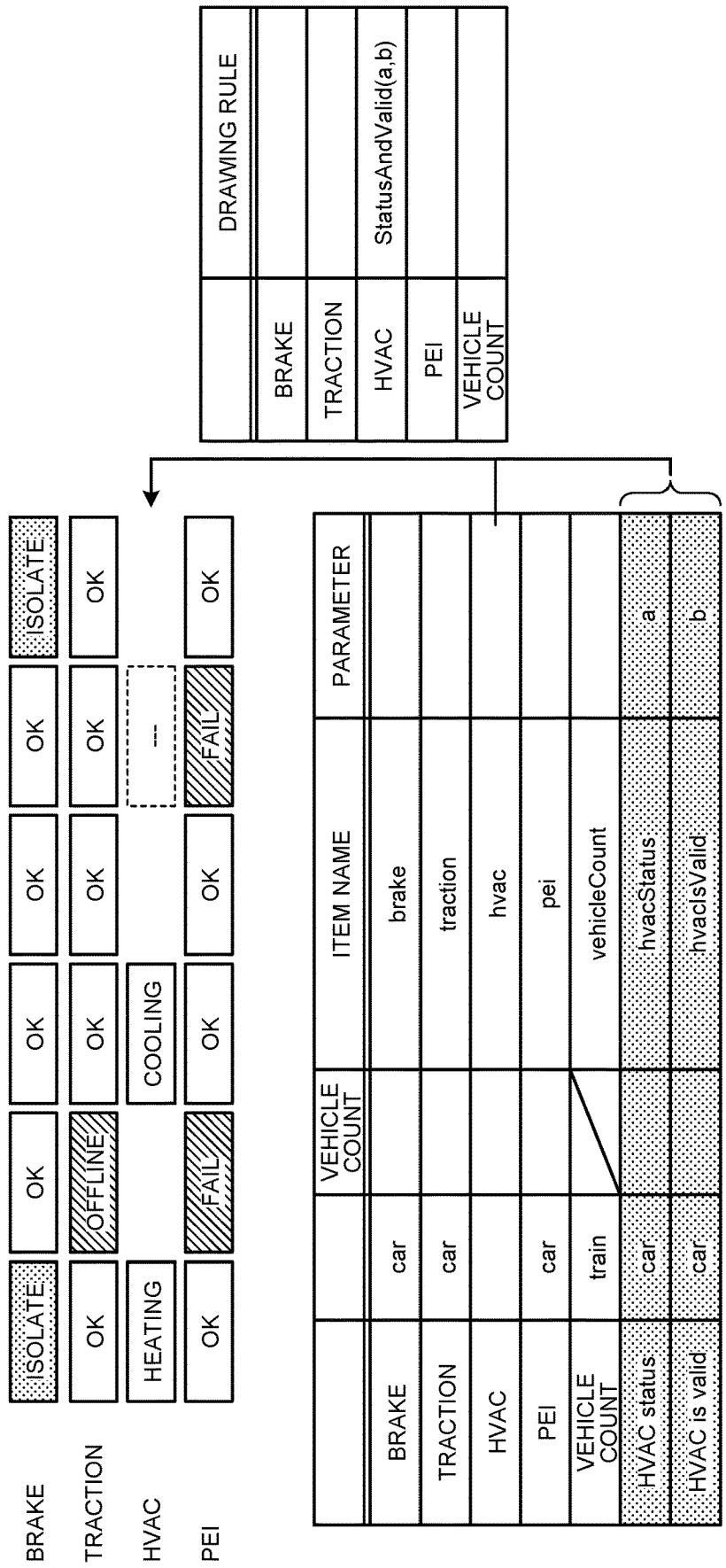
FIG. 21 is a diagram illustrating an example of the correspondence relationship between signal definitions held in a signal definition holding unit and the drawing part 3 displayed based on drawing data held in a drawing table of a drawing data holding unit in the train cab display device according to the third embodiment.

FIG. 21 is a diagram illustrating an example of the correspondence relationship between signal definitions held in the signal definition holding unit 33b and the drawing part 3 displayed by drawing data held in the drawing table 22c of the drawing data holding unit 22 in the train cab display device 100b according to the third embodiment. FIG. 21 illustrates that to obtain drawing data to be held in the drawing table 22c of the drawing data holding unit 22, a new value of the second signal corresponding to the drawing data is determined by calculation of the values of two second signals. The example of FIG. 21 shows that to obtain the status of the HVAC of a car, a new value of the second signal indicating the status of the HVAC of the car is determined by the arithmetic expression "StatusAndValid(a, b)", using the values of two second signals obtained by two first signals based on the two signal definitions "hvacStatus" and "hvacIsValid". FIG. 21 omits the descriptions of the BRAKE, TRACTION, and PEI as they are handled in the same manner as the HVAC.

For the new value of the second signal determined by the calculation of the signal data calculation unit 36b, the signal data storage unit 35b changes the method of storing a new value of the second signal into the drawing data holding unit 22. Specifically, based on a new value of the second signal, the signal data storage unit 35b stores the new value of the second signal in the drawing data holding unit 22 when the corresponding device is in operation or stopped. Alternatively, based on a new value of the second signal, the signal data storage unit 35b does not store the new value of the second signal in the drawing data holding unit 22 when the corresponding device is not mounted, or generates the value of a second signal indicating that it is in a situation where the corresponding device is not mounted and stores it in the drawing data holding unit 22. Alternatively, based on a new value of the second signal, when the corresponding device is in a specified status, for example, in an invalid status, the signal data storage unit 35b generates the value of a second signal indicating that the corresponding device is in the specified status, that is, the invalid status and stores it in the drawing data holding unit 22.

In the example of FIG. 21, when a new value of the second signal determined by the calculation of the signal data calculation unit 36b indicates that the HVAC is in a "HEATING" or "COOLING" status, the signal data storage unit 35b stores the new value of the second signal in the drawing data holding unit 22. When a new value of the second signal determined by the calculation of the signal data calculation unit 36b indicates that the HVAC is not mounted, the signal data storage unit 35b does not store the new value of the second signal in the drawing data holding unit 22, or generates the value of a second signal indicating that the HVAC is not mounted and stores it in the drawing data holding unit 22. When a new value of the second signal determined by the calculation of the signal data calculation unit 36b indicates that the HVAC is in the invalid status, the signal data storage unit 35b generates the value of a second signal indicating that the HVAC is in the invalid status and stores it in the drawing data holding unit 22. The value of the second signal indicating that the HVAC is in the invalid status is a value of a second signal by which, for example, "---" is displayed when the drawing processing execution unit 23 displays it on the output device 70.

Figure 22:
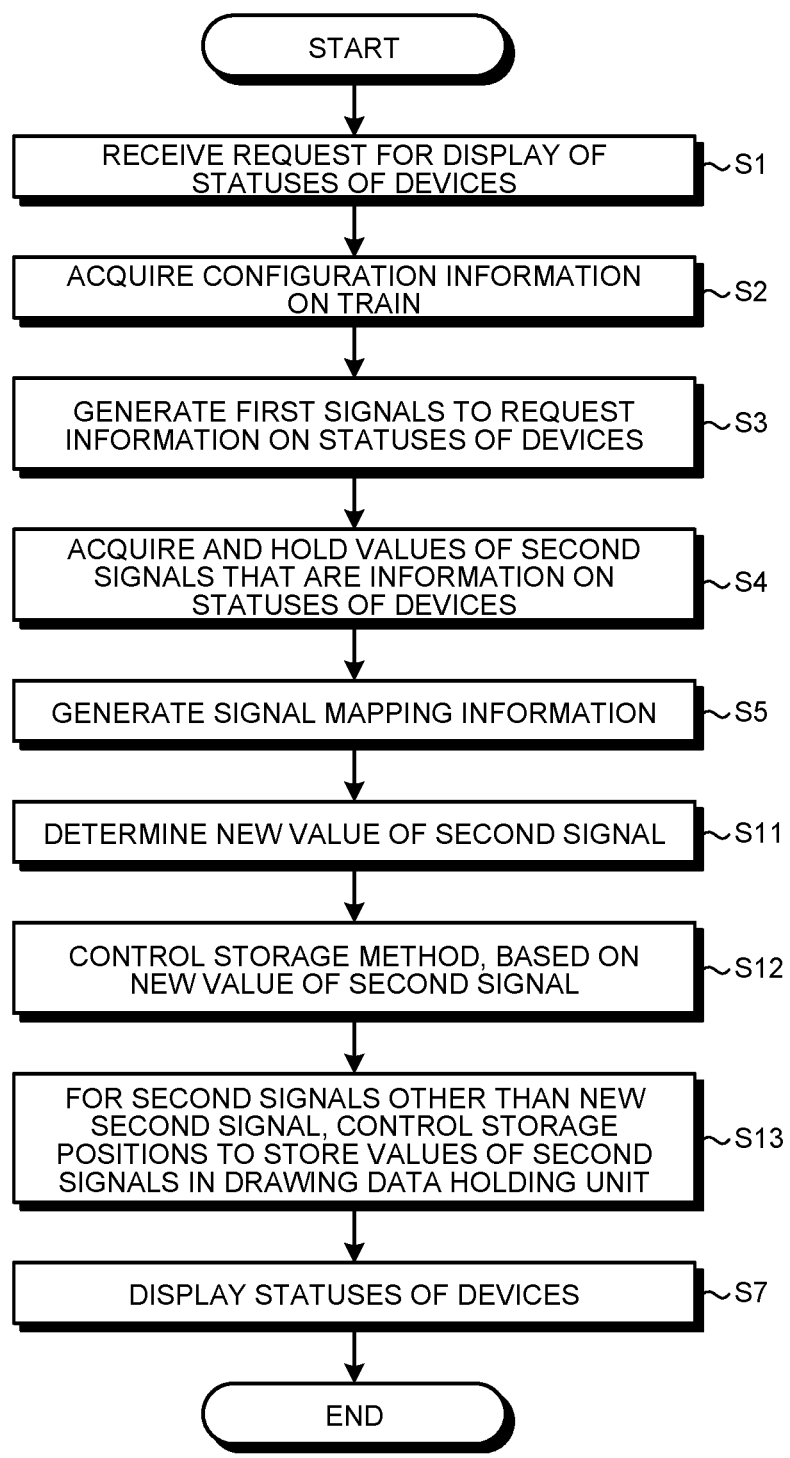
FIG. 22 is a flowchart illustrating the operation of the train cab display device according to the third embodiment to display the statuses of devices mounted on cars of a train.

FIG. 22 is a flowchart illustrating the operation of the train cab display device 100b according to the third embodiment to display the statuses of the devices mounted on the cars of the train. The operation from step S1 to step S11 is the same as that in the second embodiment.

For a new value of the second signal determined by the calculation of the signal data calculation unit 36b, the signal data storage unit 35b controls the method of storing a new value of the second signal into the drawing data holding unit 22 (step S12). As described above, for the new value of the second signal, the signal data storage unit 35b changes the method of storing a value in the drawing data holding unit 22 depending on the new value of the second signal.

For the values of the second signals other than the new value of the second signal determined by the calculation of the signal data calculation unit 36b, the signal data storage unit 35b controls the storage positions of the values of the second signals in the drawing data holding unit 22, based on the signal mapping information generated by the signal mapping generation unit 34, and accordingly stores the values of the second signals in the drawing data holding unit 22 (step S13). For the values of the second signals other than the new value of the second signal determined by the calculation of the signal data calculation unit 36b, the signal data storage unit 35b performs the same operation as in step S6 of the first and second embodiments.

The operation in step S7 after step S13 is the same as that in the first and second embodiments. However, based on the drawing data held in the drawing tables of the drawing data holding unit 22, the drawing processing execution unit 23 does not display a device on which there is no corresponding drawing data or which is not mounted, on the display screen 71 of the output device 70. Further, based on the drawing data held in the drawing tables of the drawing data holding unit 22, when the corresponding drawing data is for displaying "---", the drawing processing execution unit 23 displays "---" as the status of the device on the display screen 71 of the output device 70.

Note that the hardware configuration of the train cab display device 100b of the third embodiment is implemented by the same configuration as the hardware configuration of the train cab display device 100 of the first embodiment.

As described above, according to the present embodiment, when displaying a status of a device, the train cab display device 100b does not display the device on the display screen 71 of the output device 70 if there is not any drawing data for the objective device. When the device is in a specified status such as an invalid status, the train cab display device 100b performs display indicating that the status of the device is the specified status. On the basis of this concept, the train cab display device 100b does not display devices other than the objective device whose status is to be displayed, or displays "---", thereby making it possible to effectively display the status of the device to be displayed.

Fourth Embodiment

The first to third embodiments are on the assumption that it is predefined how the drawing processing execution unit 23 displays the drawing data of the drawing parts held by the drawing data holding unit 22 when performing display on the display screen 71 of the output device 70. Specifically, it has been defined that when the drawing data of a device is "0", the drawing processing execution unit 23 should display "OK" on the display screen 71 of the output device 70. In a fourth embodiment, a user can set and change contents displayed on the display screen 71 of the output device 70 by the drawing processing execution unit. Differences from the first to third embodiments will be described.

Figure 23:
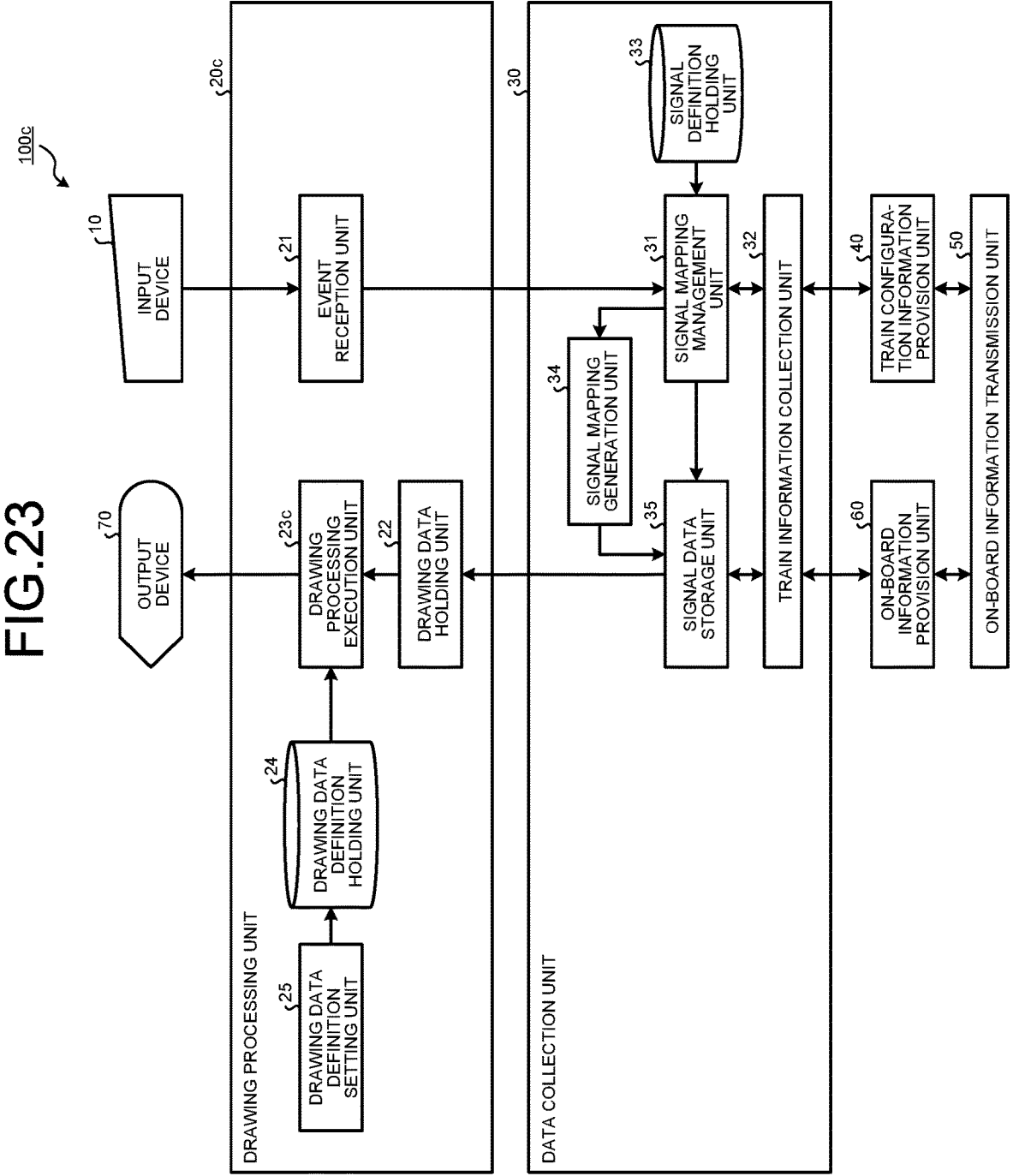
FIG. 23 is a block diagram illustrating a configuration example of a train cab display device according to a fourth embodiment.

FIG. 23 is a block diagram illustrating a configuration example of a train cab display device 100c according to the fourth embodiment. The train cab display device 100c includes a drawing processing unit 20c in place of the drawing processing unit 20 in the train cab display device 100 of the first embodiment. The drawing processing unit 20c includes the event reception unit 21, the drawing data holding unit 22, a drawing processing execution unit 23c, a drawing data definition holding unit 24, and a drawing data definition setting unit 25.

The drawing data definition holding unit 24 holds drawing data definitions that define contents in which the statuses of devices are to be displayed on the display screen 71 of the output device 70 by the drawing processing execution unit 23c based on the drawing data.

The drawing data definition setting unit 25 receives setting of drawing data definitions from a user such as a driver, and sets the drawing data definitions in the drawing data definition holding unit 24. The drawing data definition setting unit 25 may be outside the drawing processing unit 20c.

The drawing processing execution unit 23c reads drawing data from the drawing tables of the drawing data holding unit 22, and then performs display on the display screen 71 of the output device 70 in accordance with the drawing data definitions associated with the read drawing data.

Examples of the drawing data definitions include display contents such as characters corresponding to the drawing data, the colors of characters and background to be displayed, the size of a character, the arrangement of characters, and more. An object to be displayed may be a figure instead of a character. For a drawing data definition, the order of devices when the statuses of the devices are displayed may be defined.

In the train cab display device 100c of the fourth embodiment, the operation of the data collection unit 30 and communication between the data collection unit 30 and the drawing processing unit 20c are the same as those in the first embodiment. The fourth embodiment, which has been described with the first embodiment as an example, is also applicable to the second and third embodiments.

The hardware configuration of the train cab display device 100c of the fourth embodiment is implemented by the same configuration as the hardware configuration of the train cab display device 100 of the first embodiment.

As described above, according to the present embodiment, the train cab display device 100c allows displayed contents of the statuses of devices for the drawing data to be set and changed as desired. Thus, even in operation, the train cab display device 100c can change the displayed contents on the statuses of devices.

The configurations illustrated in the above embodiments illustrate examples of the subject matter of the present invention, and so can be combined with other publicly known techniques and partly omitted and/or modified without departing from the scope of the present invention.

REFERENCE SIGNS LIST 10 input device; 20, 20c drawing processing unit; 21 event reception unit; 22 drawing data holding unit; 22a, 22b, 22c drawing table; 23, 23c drawing processing execution unit; 24 drawing data definition holding unit; 25 drawing data definition setting unit; 30, 30a, 30b data collection unit; 31, 31a, 31b signal mapping management unit; 32 train information collection unit; 33, 33a, 33b signal definition holding unit; 34 signal mapping generation unit; 35, 35a, 35b signal data storage unit; 36, 36b signal data calculation unit; 40 train configuration information provision unit; 50 on-board information transmission unit; 60 on-board information provision unit; 70 output device; 71 display screen; 100, 100a, 100b, 100c train cab display device.

The invention claimed is:

1. A display device mounted on a cab of a train, the device comprising:
   a drawing processor to display a plurality of statuses of a plurality of devices mounted on a plurality of cars of the train; and
   a processor configured to:
      hold a plurality of signal definitions respectively specifying a set of devices mounted on a car and defining information to request on a status of the set of devices mounted on the car, wherein the set of devices is part of the plurality of devices;
      acquire configuration information including information on a number of cars and a traveling direction of the train, which is acquired by an on-board information transmission unit mounted on a car, and after acquiring the configuration information including the information on the number of cars and the traveling direction of the train, generate a plurality of first signals comprising at least one separate signal specific to each device of the plurality of devices, based on (a) each device on each car specified in the plurality of signal definitions and (b) the number of cars specified in the configuration information to request information on the plurality of statuses of the plurality of devices;
      hold a plurality of values of a plurality of second signals that is information on the plurality of statuses of the plurality of devices acquired by the processor in response to the plurality of first signals; and
      generate signal mapping information for specifying an arrangement of the plurality of cars on a display screen on which the plurality of statuses of the plurality of devices are to be displayed, based on the acquired configuration information, and output the signal mapping information.

2. The display device according to claim 1, wherein the drawing processor displays the plurality of statuses of the plurality of devices in accordance with an order of drawing data sets that are values for the plurality of second signals.

3. The display device according to claim 1, wherein the drawing processor is configured to:
   hold the drawing data that is the plurality of values of the plurality of second signals in drawing tables formed in units of drawing parts into which display contents displayed on the display screen are transformed; and
   display the plurality of statuses of the plurality of devices on the display screen using a plurality of drawing parts, based on the drawing data held in the drawing tables.

4. The display device according to claim 3, wherein the processor controls a storage position of each value of the plurality of second signals in the drawing table, based on the signal mapping information, to accordingly store each value of the plurality of second signals in the drawing table.

5. The display device according to claim 1, wherein the processor acquires the configuration information upon receiving an external request and generates the plurality of first signals.

6. The display device according to claim 1, wherein the processor periodically acquires the configuration information, and generates the plurality of first signals when there is a change in the configuration information.

7. The display device according to claim 3, wherein:
   the processor is configured to determine, by calculation, a new value of a second signal indicating one status of a specified device mounted to a specified car, using values of a plurality of second signals associated with the specified car,
   wherein the processor further holds information on an arithmetic expression for the processor to calculate the new value of the second signal using the values of the plurality of second signals associated with the specified car, and
   the processor holds the new value of the second signal together with the plurality of values of the plurality of second signals, and stores the new value of the second signal in the drawing table.

8. The display device according to claim 3, wherein:
   the processor is configured to determine, by calculation, a new value of a second signal indicating one status of a specified device in a specified car, using values of a plurality of second signals associated with the specified car,
   wherein the processor further holds information on an arithmetic expression for the processor to calculate the new value of the second signal using the values of the plurality of second signals associated with the specified car, and
   the processor does not store the new value of the second signal in the drawing table if the specified device satisfies a predetermined criterion.

9. The display device according to claim 3, wherein:
   the drawing processor is configured to hold drawing data definitions that define contents in which the plurality of statuses of the plurality of devices are displayed on the display screen by the drawing processor based on the drawing data,
   wherein the drawing processor reads out the drawing data from the drawing tables, and then performs display on the display screen in accordance with the drawing data definitions associated with the read drawing data.

10. An on-board information display method for a display device mounted on a cab of a train, the train comprising a plurality of devices mounted on a plurality of cars, the method comprising:
    a signal definition acquisition step, by a processor, of obtaining a plurality of signal definitions respectively specifying a set of devices mounted on a car and defining information to request on a status of the set of devices mounted on the car, wherein the set of devices is part of the plurality of devices;

a configuration information acquisition step, by the processor, of acquiring configuration information including information on a number of cars and a traveling direction of the train, which is acquired by an on-board information transmission unit mounted on a car;

a first signal generation step, by the processor, of after acquiring the configuration information including the number of cars and the traveling direction of the train, generating a plurality of first signals comprising at least one separate signal specific to each device of the plurality of devices, based on (a) each device on each car specified in a plurality of signal definitions and (b) the number of cars specified in the configuration information for requesting information on a plurality of statuses of the plurality of devices;

a second signal value acquisition step, by the processor, of acquiring a plurality of values of a plurality of second signals that is information on the status of the plurality of devices in response to the plurality of first signals;

a signal mapping information generation step, by the processor, of generating signal mapping information for specifying an arrangement of the plurality of cars on a display screen on which the plurality of statuses of the plurality of devices are displayed, based on the configuration information;

a storage step, by the processor, of controlling a storage position of each value of each second signal in a drawing processor, based on the signal mapping information, to accordingly store each value of each second signal in the drawing processor;

a drawing data holding step, by the drawing processor, of holding drawing data that is the plurality of values of the plurality of second signals in drawing tables in units of drawing parts into which display contents displayed on the display screen are transformed; and a display step, by the drawing processor, of displaying the plurality of statuses of the plurality of devices on the display screen using a plurality of drawing parts, based on the drawing data held in the drawing tables.

11. The on-board information display method according to claim 10, wherein
the processor acquires the configuration information when receiving an external request in the configuration information acquisition step, and generates the plurality of first signals, based on the plurality of signal definitions and the configuration information to request information on the plurality of statuses of the plurality of devices in the first signal generation step.

12. The on-board information display method according to claim 10, wherein
the processor periodically acquires the configuration information in the configuration information acquisition step, and when there is a change in the configuration information, the processor generates the plurality of first signals based on the plurality of signal definitions and the configuration information to request information on the plurality of statuses of the devices in the first signal generation step.

13. The on-board information display method according to claim 10, further comprising:
when the processor further holds information on an arithmetic expression for calculating a new value of a second signal indicating one status of a specified device using values of a plurality of second signals associated with the specified car, and a calculation step, by the processor, of determining, by calculation, the new value of the second signal using the values of the plurality of second signals associated with the specified car, wherein the processor holds the new value of the second signal together with the plurality of values of the plurality of second signals, and stores the new value of the second signal in the drawing table in the storage step.

14. The on-board information display method according to claim 10, further comprising:
when the processor further holds information on an arithmetic expression for calculating a new value of a second signal indicating one status of a specified device in a specified car using values of a plurality of second signals associated with the specified car, a calculation step, by the processor, of determining, by calculation, the new value of the second signal using the values of the plurality of second signals associated with the specified car, wherein in the storage step, the processor does not store the new value of the second signal in the drawing table if the specified device satisfies a predetermined criterion.

15. The on-board information display method according to claim 10, wherein
when the drawing processor holds drawing data definitions that define contents in which the plurality of statuses of the plurality of devices are displayed on the display screen based on the drawing data, in the display step, the drawing processor reads out the drawing data from the drawing tables, and then performs display on the display screen according to the drawing data definitions associated with the read drawing data.

16. A display device mounted on a cab of a train, the device comprising:
a drawing processing circuitry to display a plurality of statuses of a plurality of devices mounted on a plurality of cars of the train; and a data collection circuitry comprising:
a signal definition holding circuitry to hold a plurality of signal definitions respectively specifying a set of devices mounted on a car and defining information to request on a status of the set of devices mounted on the car, wherein the set of devices is part of the plurality of devices;

a signal mapping management circuitry to acquire configuration information including information on a number of cars and a traveling direction of the train, which is acquired by an on-board information transmission circuitry mounted on a car, and after acquiring the configuration information including the information on the number of cars and the traveling direction of the train, generate a plurality of first signals comprising at least one separate signal specific to each device of the plurality of devices, based on (a) each device on each car specified in the plurality of signal definitions and (b) the number of cars specified in the configuration information to request information on the plurality of statuses of the plurality of devices;

a signal data storage circuitry to hold a plurality of values of a plurality of second signals that is information on the plurality of statuses of the plurality of devices acquired by the signal mapping management circuitry in response to the plurality of first signals; and a signal mapping generation circuitry to generate signal mapping information for specifying an arrangement of the plurality of cars on a display screen on which the plurality of statuses of the plurality of devices are to be displayed, based on the configuration information acquired from the signal mapping management circuitry, and output the signal mapping information to the signal data storage circuitry.

\* \* \* \* \*